(12) United States Patent
Sivertsen

(10) Patent No.: US 7,454,490 B2
(45) Date of Patent: Nov. 18, 2008

(54) IN-LINE VIDEO, KEYBOARD AND MOUSE REMOTE MANAGEMENT UNIT

(75) Inventor: Clas G. Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 474 days.

(21) Appl. No.: 10/867,406

(22) Filed: Jun. 14, 2004

(65) Prior Publication Data

US 2004/0222944 A1   Nov. 11, 2004

Related U.S. Application Data

(63) Continuation-in-part of application No. 10/247,876, filed on Sep. 20, 2002.

(51) Int. Cl.
  *G06F 15/173* (2006.01)
  *G06F 15/16* (2006.01)
  *G09G 5/00* (2006.01)

(52) U.S. Cl. .................. 709/223; 709/204; 345/2.2; 345/603

(58) Field of Classification Search ............... 709/204, 709/205, 248, 223; 345/537, 1.1, 2.1, 2.2, 345/603
See application file for complete search history.

(56) References Cited

U.S. PATENT DOCUMENTS

| | | | |
|---|---|---|---|
| 4,589,068 A | 5/1986 | Heinen, Jr. .................. 717/127 |
| 4,979,074 A | 12/1990 | Morley et al. ................ 361/720 |
| 5,228,039 A | 7/1993 | Knoke et al. ................. 714/28 |
| 5,388,252 A | 2/1995 | Dreste et al. | |
| 5,455,933 A | 10/1995 | Schieve et al. ............... 714/27 |
| 5,491,743 A | 2/1996 | Shiio et al. .................. 709/204 |
| 5,615,331 A | 3/1997 | Toorians et al. ........ 395/182.07 |
| 5,625,410 A | 4/1997 | Washino et al. | |
| 5,630,049 A | 5/1997 | Cardoza et al. ............... 714/25 |
| 5,732,212 A | 3/1998 | Perholtz et al. ............. 709/224 |
| 5,777,874 A | 7/1998 | Flood et al. ................... 700/82 |
| 5,815,653 A | 9/1998 | You et al. ..................... 714/38 |
| 5,819,093 A | 10/1998 | Davidson et al. ............ 717/126 |
| 5,850,562 A | 12/1998 | Crump et al. ................ 395/800 |
| 5,878,158 A | 3/1999 | Ferris et al. | |
| 5,953,451 A | 9/1999 | Syeda-Mahmood | |
| 5,990,852 A | 11/1999 | Szamrej ...................... 345/2.1 |
| 6,011,920 A | 1/2000 | Edwards et al. | |
| 6,035,059 A | 3/2000 | Kurosawa et al. | |

(Continued)

OTHER PUBLICATIONS

"Cable Allows User to Extend DVI Connections" by 'the Mac Observer' staff, published Jul. 31, 2001, printed from www.macobserver.com 4 pages.*

(Continued)

*Primary Examiner*—David Lazaro
(74) *Attorney, Agent, or Firm*—Hope Baldauff Hartman, LLC

(57) ABSTRACT

Methods and devices provide for remote management of a local computer by transferring screen frames produced by the local computer for viewing at a remote computer. A digital video signal from a local computer may be duplicated and scaled so that screen frame data corresponding to the screen frames produced by the local computer is passed through a network, such as the Internet, to the remote computer where the remote computer produces a display that contains the screen frames being transferred.

12 Claims, 17 Drawing Sheets

U.S. PATENT DOCUMENTS

| | | | |
|---|---|---|---|
| 6,360,250 B1 | 3/2000 | Anupam et al. | 709/204 |
| 6,054,676 A | 4/2000 | Wall et al. | 219/209 |
| 6,055,334 A | 4/2000 | Kato | |
| 6,065,072 A | 5/2000 | Flath | 710/29 |
| 6,115,645 A | 9/2000 | Berar | |
| 6,119,247 A | 9/2000 | House et al. | 714/38 |
| 6,124,811 A | 9/2000 | Acharya et al. | |
| 6,137,455 A | 10/2000 | Duo | 345/520 |
| 6,145,088 A | 11/2000 | Stevens | 714/2 |
| 6,170,021 B1 | 1/2001 | Graf | 710/15 |
| 6,202,070 B1 | 3/2001 | Nguyen et al. | |
| 6,219,695 B1 | 4/2001 | Guttag et al. | 709/217 |
| 6,236,884 B1 | 5/2001 | Hunter et al. | |
| 6,243,743 B1 | 6/2001 | Freeny | 709/217 |
| 6,263,373 B1 | 7/2001 | Cromer et al. | |
| 6,272,562 B1 | 8/2001 | Scott et al. | 710/16 |
| 6,288,753 B1 | 9/2001 | DeNicola et al. | |
| 6,304,895 B1 | 10/2001 | Schneider et al. | 709/203 |
| 6,330,167 B1 | 12/2001 | Kobayashi | 361/818 |
| 6,377,461 B1 | 4/2002 | Ozmat et al. | 361/704 |
| 6,378,014 B1 | 4/2002 | Shirley | 710/100 |
| 6,397,256 B1 | 5/2002 | Chan et al. | 709/229 |
| 6,414,716 B1 | 7/2002 | Kawai | 348/211.3 |
| 6,434,003 B1 | 8/2002 | Roy et al. | 361/699 |
| 6,476,854 B1 | 11/2002 | Emerson et al. | 348/143 |
| 6,552,914 B1 | 4/2003 | Chang | |
| 6,560,641 B1 | 5/2003 | Powderly et al. | 709/219 |
| 6,603,665 B1 | 8/2003 | Truong et al. | 361/752 |
| 6,609,034 B1 | 8/2003 | Behrens et al. | 700/19 |
| 6,636,929 B1 | 10/2003 | Frantz et al. | 710/313 |
| 6,651,120 B2 | 11/2003 | Chiba et al. | |
| 6,651,190 B1 | 11/2003 | Worley et al. | 714/43 |
| 6,662,217 B1 | 12/2003 | Godfrey et al. | |
| 6,664,969 B1 | 12/2003 | Emerson et al. | 345/544 |
| 6,681,250 B1 | 1/2004 | Thomas et al. | 709/226 |
| 6,754,891 B1 | 6/2004 | Snyder et al. | 717/128 |
| 6,816,963 B1 | 11/2004 | Krithivas et al. | |
| 6,820,267 B2 | 11/2004 | Christensen et al. | |
| 6,959,380 B2 | 10/2005 | Dake et al. | |
| 6,963,425 B1 | 11/2005 | Nair et al. | |
| 6,993,747 B1 | 1/2006 | Friedman | 717/124 |
| 7,039,229 B2 | 5/2006 | Lin et al. | |
| 7,165,041 B1 | 1/2007 | Guheen et al. | 705/26 |
| 7,181,510 B2 | 2/2007 | Emerson et al. | |
| 7,209,874 B2 | 4/2007 | Salmonsen | |
| 7,231,606 B2 | 6/2007 | Miller et al. | |
| 7,299,463 B2 | 11/2007 | Brannock et al. | |
| 2001/0027465 A1 | 10/2001 | Hammelbacher | |
| 2001/0037366 A1 | 11/2001 | Web et al. | 709/204 |
| 2002/0040418 A1 | 4/2002 | Bress et al. | 711/112 |
| 2002/0087949 A1 | 7/2002 | Golender et al. | 717/124 |
| 2002/0097234 A1 | 7/2002 | Sauber | 345/204 |
| 2002/0103882 A1 | 8/2002 | Johnston et al. | |
| 2002/0174415 A1 | 11/2002 | Hines | 717/127 |
| 2002/0194403 A1 | 12/2002 | Pua et al. | 710/62 |
| 2002/0199035 A1 | 12/2002 | Christensen et al. | |
| 2003/0035049 A1* | 2/2003 | Dickens et al. | 348/100 |
| 2003/0058248 A1* | 3/2003 | Hochmuth et al. | 345/537 |
| 2003/0083842 A1 | 5/2003 | Miller et al. | 702/122 |
| 2003/0110244 A1 | 6/2003 | Mondal | 709/223 |
| 2003/0156132 A1 | 8/2003 | Gn et al. | |
| 2003/0177111 A1 | 9/2003 | Egendorf et al. | |
| 2003/0200273 A1 | 10/2003 | Khanna et al. | |
| 2003/0226015 A1 | 12/2003 | Neufeld et al. | |
| 2004/0059782 A1 | 3/2004 | Sivertsen | |
| 2004/0158614 A1 | 8/2004 | Williams | |
| 2004/0190773 A1 | 9/2004 | Messer et al. | 382/182 |
| 2004/0255276 A1 | 12/2004 | Rovang | 717/124 |
| 2005/0066000 A1 | 3/2005 | Liaw et al. | |
| 2005/0086670 A1 | 4/2005 | Christensen et al. | |
| 2006/0189900 A1 | 8/2006 | Flaherty | |
| 2006/0195042 A1 | 8/2006 | Flaherty | |

OTHER PUBLICATIONS

U.S. Appl. No. 10/966,221, filed Oct. 15, 2004, entitled "Systems and Methods for Capturing Screen Displays from a Host Computing System for Display at a Remote Terminal." Inventor: Umasankar Mondal.

U.S. Official Action dated Feb. 3, 2005 in U.S. Appl. No. 10/247,876.

U.S. Notice of Allowance and Allowability dated Nov. 10, 2004 in U.S. Appl. No. 10/867,348.

Raritan Computer, Inc., "Raritan Announces New Paragon CIMs with Innovative DirectConnect Technology", a press release, Jan. 14, 2002, printed from www.raritan.com on Jan. 27, 2005.

U.S. Official Action dated Aug. 8, 2005 in U.S. Appl. No. 10/247,876.

U.S. Appl. No. 10/446,044, filed May 27, 2003, entitled "Method and System for Remote Software Debugging." Inventors: Subramonian Shankar and Jason Andrew Messer.

U.S. Appl. No. 10/926,241, filed Aug. 25, 2004, entitled "Apparatus, Methods, and System for Redirecting Input and Output for Multiple Computers." Inventor: Clas Gerhard Sivertsen.

U.S. Official Action dated Jan. 24, 2006 in U.S. Appl. No. 10/446,044.

U.S. Official Action dated Feb. 24, 2006 in U.S. Appl. No. 10/247,876.

U.S. Official Action dated Apr. 18, 2006 in U.S. Appl. No. 10/966,221.

"Z-Series Information Page" printout from Raritan website found at www.Raritan.com/products/kvm_switches/z_series/prd_line.aspx. Printed Feb. 10, 2006.

"New KVM Switching System Controls 2,048 Servers Using Cat5 Cable" printout from Raritan website found at http://www.raritan.com//about/abt_press_detail.aspx?&status=4&articleld=127, printed May 24, 2006.

U.S. Official Action dated Aug. 17, 2006, in U.S. Appl. No. 10/247,876.

U.S. Official Action dated Sep. 5, 2006 in U.S. Appl. No. 10/966,221.

U.S. Official Action dated Oct. 5, 2006 in U.S. Appl. No. 10/446,044.

U.S. Official Action dated Aug. 13, 2003 in U.S. Appl. No. 10/016,484.

U.S. Official Action dated Mar. 8, 2004 in U.S. Appl. No. 10/016,484.

U.S. Official Action dated Jun. 22, 2004 in U.S. Appl. No. 10/016,484.

U.S. Official Action dated Feb. 23, 2004 in U.S. Appl. No. 10/247,876.

U.S. Official Action dated Aug. 3, 2004 in U.S. Appl. No. 10/247,876.

U.S. Official Action dated Apr. 5, 2007, in U.S. Appl. No. 10/446,044.

U.S. Appl. No. 10/875,641, filed Jun. 24, 2004, entitled "Method and System for Remote Software Debugging," Inventors: Stefano Righi and Eric Mills.

U.S. Official Action dated Jun. 29, 2007 in U.S. Appl. No. 10/462,509.

U.S. Official Action dated Mar. 6, 2007 in U.S. Appl. No. 10/462,509.

U.S. Official Action dated Sep. 11, 2006 in U.S. Appl. No. 10/462,509.

U.S. Official Action dated Sep. 18, 2007, in U.S. Appl. No. 10/446,044.

U.S. Official Action dated Mar. 6, 2007 in U.S. Appl. No. 10/403,198.

U.S. Official Action dated Sep. 19, 2006 in U.S. Appl. No. 10/403,198.

U.S. Notice of Allowance and Allowability dated Sep. 18, 2007 in U.S. Appl. No. 10/403,198.

U.S. Notice of Allowance and Allowability dated Nov. 10, 2004 in U.S. Appl. No. 10/867,348.

U.S. Notice of Allowance and Allowability dated Apr. 11, 2007 in U.S. Appl. No. 10/247,876.

U.S. Notice of Allowance and Allowability dated Jan. 5, 2007 in U.S. Appl. No. 10/966,221.

U.S. Notice of Allowance and Allowability dated Jul. 15, 2004 in U.S. Appl. No. 10/016,484.

U.S. Notice of Allowance and Allowability dated Nov. 1, 2007 in U.S. Appl. No. 10/462,509.

U.S. Notice of Allowance and Allowability dated May 31, 2007 in U.S. Appl. No. 10/403,198.
U.S. Notice of Allowance and Allowability dated Jan. 11, 2008 in U.S. Appl. No. 10/403,198.
U.S. Official Action dated Sep. 19, 2006, in U.S. Appl. No. 10/403,198.
U.S. Official Action dated Jul. 14, 2006 in U.S. Appl. No. 10/446,044.
U.S. Official Action dated Apr. 5, 2007 in U.S. Appl. No. 10/446,044.
U.S. Official Action dated Jan. 8, 2008 in U.S. Appl. No. 10/446,044.
U.S. Official Action dated Nov. 29, 2007 in U.S. Appl. No. 10/462,509.
U.S. Official Action dated Dec. 17, 2007 in U.S. Appl. No. 10/790,160.
U.S. Official Action dated Jul. 27, 2007 in U.S. Appl. No. 10/875,641.
U.S. Official Action dated Jan. 10, 2008 in U.S. Appl. No. 10/875,641.
American Megatrends AMIDiag User's Guide (Version 2.0), 2002. http://ami.com/support/docc/MAN-DIAG-WIN.pdf.
American Megatrends AMIDebug User's Guide (Version 2.0), 2002.
U.S. Notice of Allowance / Allowability dated May 13, 2008 in U.S. Appl. No. 10/403,198.
U.S. Official Action dated Jun. 3, 2008 in U.S. Appl. No. 10/875,641.
U.S. Notice of Allowance / Allowability dated Jun. 9, 2008 in U.S. Appl. No. 10/446,044.
U.S. Official Action dated Jun. 25, 2008 in U.S. Appl. No. 10/790,160.
U.S. Official Action dated Jul. 9, 2008 in U.S. Appl. No. 10/462,509.
U.S. Appl. No. 10/016,484, filed Dec. 10, 2001, entitled "Systems and Methods for Capturing Screen Displays from a Host Computing System for Display at a Remote Terminal." Inventor: Umasankar Mondal.
U.S. Appl. No. 10/247,876, filed Sep. 20, 2002, entitled "Systems and Methods for Establishing Interaction Between a Local Computer and a Remote Computer." Inventor: Clas Gerhard Sivertsen.
U.S. Appl. No. 10/790,160, filed Mar. 1, 2004, entitled "Method, System, and Apparatus for Communicating with a Computer Management Device." Inventor: Subash Kalbarga.
U.S. Appl. No. 10/867,348, filed Jun. 14, 2004, entitled "Housing for In-Line Video, Keyboard and Mouse Remote Management Unit." Inventor: Clas Gerhard Sivertsen.
U.S. Official Action dated Sep. 8, 2008 in U.S. Appl. No. 10/926,241.

* cited by examiner

IN-LINE VIDEO, KEYBOARD AND MOUSE REMOTE MANAGEMENT UNIT

CROSS-REFERENCE TO RELATED APPLICATIONS

This is a continuation-in-part of U.S. Pat. No. 7,260,624, entitled "Systems and Methods for Establishing Interaction Between a Local Computer and a Remote Computer", filed Sep. 20, 2002, which is incorporated by reference herein.

TECHNICAL FIELD

The present invention relates to remote computer management. More particularly, the present invention relates to managing a local computer from another remotely located computer by providing screen displays of the local computer to the remotely located computer for display and providing user input from the remotely located computer to the local computer.

BACKGROUND OF THE INVENTION

Computers are often linked together through networks to allow the resources of a computer at one location to be used by a computer and end user at another location. In a distributed environment, computers known as servers perform various tasks for client computers that communicate with the server over a network. The server enables sharing of files and other resources between client computers and the server, such as electronic mail. As an example, a world wide web ("web") server may provide resources to client computers over the Internet.

It is often necessary to manage activities of a computer or determine the relative health of a computer system by viewing screen display information and/or interacting with the computer through user input devices. This is especially true for servers whose resources are utilized by many individual client computers, such as within a corporate network or the Internet. For many conventional systems, the technician or other user who needs to view the screen displays and interact with the computer being managed is required to be physically located at the site of the computer. However, it is not always feasible for a technician or other user to be physically present.

For example, a system administrator of a corporate network is present at one location, but the computers of the corporate network may be spread around the globe. To effectively manage the computers of the corporate network, the system administrator must be able to effectively monitor many or all of the computers of the network contemporaneously. Because the system administrator cannot be physically present at each computer to be managed at the same time, effective management of the computers of the network becomes very difficult if not impossible. As a result, costly additional human resources are required to improve management of the computers.

Present solutions to providing remote management are a service under the operating system or a software application such as PC ANYWHERE from SYMANTEC CORPORATION. However, because these present solutions are software based, the operating system must be operational with all services loaded to allow the remote monitoring to occur. Therefore, configuration and boot-up screens such as those provided by a BIOS are not made available to the remote location. For this reason, utilization of a hardware-based device is desirable. Keyboard, video, mouse ("KVM") devices exist that allow a single keyboard, monitor, and mouse to control multiple computers. However, even with a KVM device connected to a LAN to control a set of computers, the device can only address one computer at a time. It is desirable for the system administrator to be able to remotely manage a set of local computers and to be able to run test scripts on some or all of the computers from a single remote location.

It is also desirable to be able to emulate a drive of a remote computer at a set of local computers in order to facilitate running test scripts simultaneously on the set of local computers. KVM devices known in the art lack this ability to emulate a remote computer's drive at the local computers. An additional problem arises when trying to capture a digital video signal from a digital video interface ("DVI") at the local computer and provide the signal to a local display while at the same time capturing screen frames from the signal to provide to a remote computer over a network. Since DVI uses a point-to-point configuration, the digital video signal cannot simply be split by traditional means. It is with respect to these considerations and others that the present invention has been made.

SUMMARY OF THE INVENTION

Aspects of the present invention address these problems and others by providing screen frames produced by a local computer to a remote computer for display and/or providing user input from the remote computer to the local computer. Thus, a user can view the screen information of the local computer anywhere a remote computer is located, without physically being present at the local computer. A digital video signal from a local computer may be duplicated and scaled so that screen frame data corresponding to the screen frames produced by the local computer is passed through a network, such as the Internet, to the remote computer where the remote computer produces a display that contains the screen frames being transferred. The user may run test scripts on a set of local computers simultaneously from a remote computer using interaction devices, which emulate local drives, connected to each of the local computers.

According to one aspect of the invention, a method is provided for obtaining screen displays of a local computer and providing them to a remote computer over a network. The method involves receiving a digital video signal representing screen frames of the local computer via a DVI input connection at a first DVI receiver. At the first DVI receiver, a first digital red-green-blue ("RGB") signal is created from the received digital video signal. A screen frame is grabbed and stored from the digital RGB signal. Data related to the stored screen frame is transmitted through a network interface. The first digital RGB signal is provided to a DVI transmitter, a duplication of the digital video signal is created from the first digital RGB signal at the DVI transmitter, and the duplication is transmitted via a DVI output connection.

According to another aspect of the invention, an interaction device is provided for obtaining screen displays of a local computer and providing them to a remote computer over a network. The interaction device includes a DVI input connection that receives a digital video signal. A DVI receiver creates a first digital RGB signal from the digital video signal. A frame grabber captures screen frame data from the digital RGB signal. A network interface provides data related to the screen frame data over the network. A DVI transmitter receives the digital RGB signal, creates a duplication of the digital video signal from the digital RGB signal, and transmits the duplication. A DVI output connection outputs the duplication of the digital video signal.

Yet another aspect of the invention provides a method for obtaining screen displays of a local computer and providing them to a remote computer over a network. The method involves receiving a digital video signal representing screen frames of the local computer via a DVI input connection at a first DVI receiver. At the first DVI receiver, a first digital RGB signal is created from the received digital video signal. The first digital RGB signal is provided to a first DVI transmitter, a first duplication of the digital video signal is created from the first digital RGB signal at the first DVI transmitter, and the first duplication is transmitted to a DVI receiver and scaler. At the DVI receiver and scaler, a scaled digital RGB signal is created from the first duplication. A screen frame is grabbed and stored from the scaled digital RGB signal, and data related to the stored screen frame is transmitted through a network interface. The first digital RGB signal is provided to a second DVI transmitter, a second duplication of the digital video signal is created from the first digital RGB signal at the second DVI transmitter, and the second duplication is transmitted via a DVI output connection.

Another aspect of the present invention provides an interaction device for obtaining screen displays of a local computer and providing them to a remote computer over a network. The interaction device includes a DVI input connection that receives a digital video signal. A first DVI receiver creates a first digital RGB signal from the digital video signal. A first DVI transmitter receives the digital RGB signal, creates a first duplication of the digital video signal from the digital RGB signal, and transmits the first duplication of the digital video signal. A DVI receiver and scaler receives the first duplication of the digital video signal, scales the digital video signal, and creates a scaled digital RGB signal. A frame grabber captures screen frame data from the scaled digital RGB signal. A network interface that provides data related to the screen frame data over the network. A second DVI transmitter receives the digital RGB signal, creates a second duplication of the digital video signal from the digital RGB signal, and transmits the second duplication. A DVI output connection outputs the second duplication of the digital video signal.

These and various other features as well as advantages, which characterize the present invention, will be apparent from a reading of the following detailed description and a review of the associated drawings.

DETAILED DESCRIPTION

Local computers may be managed remotely through embodiments of the present invention so that the system manager or other user need not be physically present with the local computer but instead views screen displays and interacts with the local computer through a remotely located computer. For example, the user can remotely view screen frames being produced by the local computer to determine whether the local computer has crashed or whether the local computer is executing a particular application. Additionally, the end user may operate a user input device of the remote computer such as a mouse or keyboard, and the user input is transferred to the local computer where it can be implemented.

Figure 1:
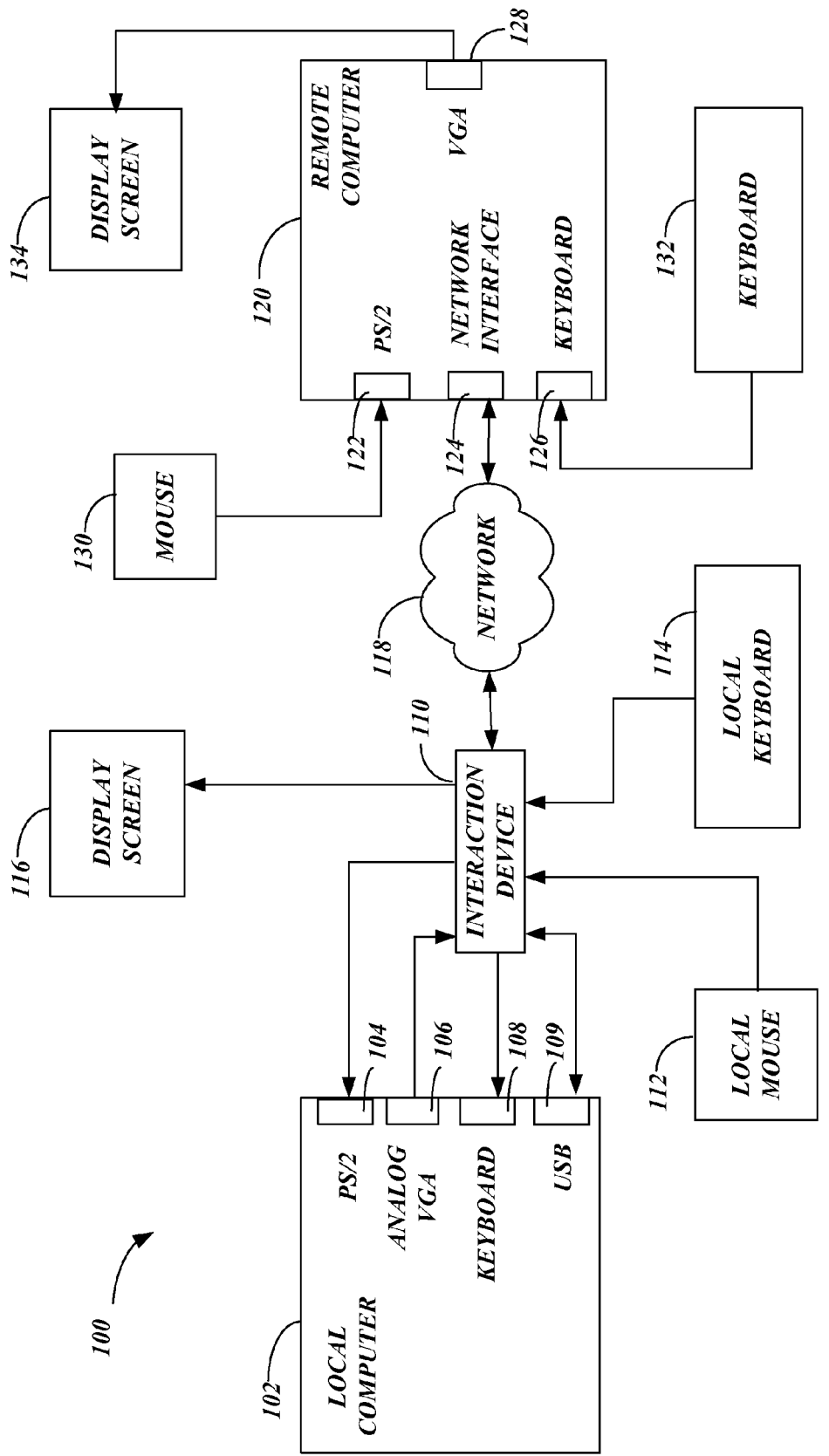
FIG. 1 illustrates a network operating environment for embodiments of the present invention that allow a remote computer to display screen frames of a local computer and provide user interaction with the screen frames.

An environment for application of embodiments of the present invention is shown in FIG. 1. The environment generally includes a local computer 102 that is to be remotely managed. An interaction device 110 is disposed between a network 118 and the local computer 102. A remote computer 120 is linked to the network 118, and the local computer 102 may or may not be linked to the same network 118 or another network not shown. The network 118 may be of various forms such as a local area network ("LAN") or wide area network ("WAN") including the Internet. A user is located at the remote computer 120 and remotely manages the local computer 102 via the network 118 and interaction device 110.

The interaction device 110 may be linked to the local computer 102 through several input/output ("I/O") connections of the local computer 102. Generally, a local computer 102 will have a video display output 106, such as an analog or digital VGA output. Also, the local computer 102 typically includes a PS/2 port or ordinary serial port configured as a mouse port 104, a keyboard port 108, and may also or alternatively include a universal serial bus ("USB") port 109.

The video display output 106 provides a signal that ordinarily is passed directly to a display screen or monitor 116 where screen frames are displayed for a user present at the local computer 102. However, in the embodiment shown, the video display output 106 provides a video signal to a video input of the interaction device 110. The interaction device 110 then passes the video signal through a video output to the display screen 116 where a normal video display of screen frames occurs. The details of the interaction device 110 and its operations upon the video signal are provided below with reference to FIGS. 2-4.

User input devices may also be provided for the local computer 102, including a local mouse 112 and local keyboard 114. Conventionally, the local mouse 112 and local keyboard 114 would be directly connected to the mouse port 104 and keyboard port 108 of the local computer 102. However, for the embodiment shown, the local mouse 112 and local keyboard 114 are connected to a mouse port and keyboard port, respectively, of the interaction device 110 and provide mouse and keyboard data to the interaction device 110 through these connections. The interaction device 110 then passes the mouse data and keyboard data to the respective ports of the local computer 102.

In addition to providing the pass-through of the video signal to the display screen 116, the interaction device 110 captures screen frame data from the video signal and transfers the screen frame data across the network 118 to the remote computer 120. The remote computer 120 has a network interface 124 linking the remote computer 120 to the network 118. The network interface 124 used by the remote computer 120 may be of various forms such as a dial-up modem or an Ethernet connection to a LAN. Various protocols of data transfer may be utilized between the interaction device 110 and the remote computer 120, such as the TCP/IP protocol ordinarily used via the Internet.

The remote computer 120 implements an application, such as a dedicated application or general purpose browser window such as a web browser, for receiving the screen frame data through the network interface 124 and providing a display on the display screen 134. The display includes the screen frame produced by the local computer 102 that corresponds to the screen frame data transferred by the interaction device 110. Typically, the remote computer 120 includes a video adapter that has a video output 128 connected to the display screen 134 to provide the video signals.

To allow the user of the remote computer 120 to fully interact with the local computer 102, user interface devices such as a mouse 130 and keyboard 132 are connected to a mouse port 122 and keyboard port 126, respectively, of the remote computer 120. The user manipulates the mouse 130 and keyboard 132 to interact with the screen frame shown on the display screen 134, which may be formed wholly or in part by the screen frame data received over the network 118. When the user activity at the remote computer 120 is entered with respect to the screen frame data received from the interaction device, then the processing device of the remote computer 120 transfers the user activity data over the network 118 to the interaction device 110 that passes it to the mouse port 104 and/or keyboard port 108.

Once the local computer 102 receives the user activity data through the mouse port 104 and/or keyboard port 108, the local computer 102 then implements the user activity as if it had occurred through the local mouse 112 or local keyboard 114. When implemented, the user activity alters the screen frame to be displayed. Therefore, the video signal output by the video connector 106 to the interaction device 110 provides the screen frames that show the change caused by the user activity at the remote computer 120, such as the mouse pointer moving or letters appearing in an electronic document.

The interaction device 110 transfers the screen frame data showing the user activity to the remote computer 120 where it is then provided to the display screen 134. Thus, the user activity initially performed at the remote computer 120 is represented on the display screen 134 immediately as it is being performed by the user and then once again after updating the video display of the local computer 102 and transferring the updated screen frame back to the remote computer 120.

As processing and propagation delays decrease within the environment 100, the initial and subsequent display of the same user activity (i.e., multiple cursors or mouse pointers) on the display screen 134 converge in time so that the user sees only one change. For example, moving a mouse pointer within the local computer screen frame shown on the display screen 134 may appear immediately as the user performs the activity and then later reappear such as a ghost movement once the screen frame update is received. However, as delays are reduced, for example by Giga-bit per second network transfer rates, the initial and subsequent mouse pointer movements converge to one movement as perceived by the user of the remote computer 120. Furthermore, as discussed below, the mouse over window option may be turned off for a browser window so that only a single mouse cursor is shown at all times, regardless of propagation delays.

In addition to receiving user input, the interaction device 110 may also provide for additional interaction with the remote computer 120 by providing a USB connection to a USB port 109 of the local computer 102. The USB connection allows the interaction device 110 to emulate USB devices for the local computer 102, such as additional storage devices including devices that the local computer 102 may use when booting-up. For example, the remote computer 120 may provide a floppy, CD-ROM, or hard disk drive that contains a boot-up sequence to be used by the local computer 102. Upon a connection being established over the network 118 between the interaction device 110 and remote computer 120, the local computer 102 may boot from a media source of the remote computer 120 with the boot-up sequence provided through the USB port 109.

The USB connection from the interaction device 110 may also allow a local keyboard and mouse and/or a keyboard and mouse of the remote computer to be emulated for the local computer 102. For example, the local computer 102 may have only USB ports instead of PS/2 ports and the interaction device 110 outputs mouse and keyboard signals to the local computer through the USB connection.

Figure 2A:
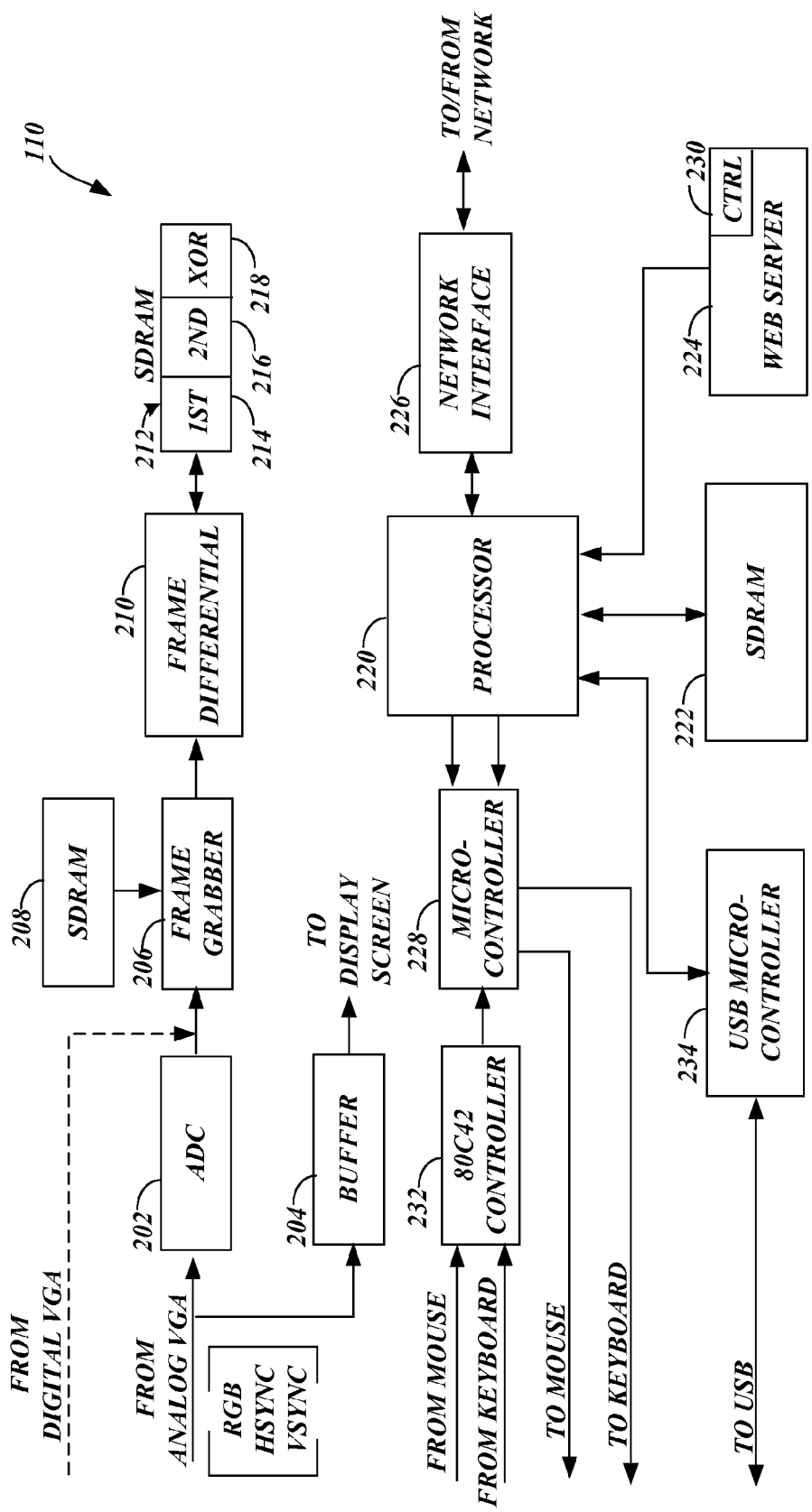
FIG. 2A shows the functional components of one embodiment of the present invention.

FIG. 2A shows the major components of one embodiment of the interaction device 110 of FIG. 1. This embodiment of the interaction device 110 includes an analog to digital converter 202 and a video buffer 204, and both of these receive the analog VGA video signal from the local computer 102. The analog VGA signal includes five distinct signals, including a red drive, a blue drive, a green drive, a horizontal synchronization pulse, and a vertical synchronization pulse. The video buffer 204 conditions the video signal through amplification and outputs it to the display screen 116 so that splitting the video signal between the converter 202 and the display screen 116 does not degrade the signal and the resulting display.

The converter 202 digitizes the video signal including the five distinct signals. The converter 202 then outputs the digitized video signal to a frame grabber 206. As one alternative, a digital video output of the local computer 102, if available, could be provided to the frame grabber 206 in place of the analog video signal that has been digitized as described above. As will be discussed in detail below with respect to FIG. 2B, this alternative requires a DVI receiver 236 and DVI transmitter 242, as well as an additional DVI transmitter 238 and a DVI receiver/scaler 240 if the signal is to be scaled prior to being transmitted to the frame grabber 206.

The frame grabber 206 takes the portion of the digitized video signal corresponding to one screen frame and outputs that portion of the digitized signal as discrete screen frame data. The converter 202 and frame grabber 206 may be separate components or may be incorporated as one component. For example, an LCD controller may be used as a frame grabber 206 to capture the screen frame data.

The screen frame data is utilized by a frame differential component 210 to compute a difference between screen frame data of a current screen and a screen frame data of an immediately preceding screen frame. The frame differential component 210 maintains a previous screen frame data in a first memory location 214 in SDRAM 212 and maintains the current screen frame data in a second memory location 216. The frame differential component 210 then executes an exclusive OR ("XOR") Boolean operation upon the two sets of screen frame data to indicate where the changes have occurred between the two. The result of the XOR operation is stored in a third memory location 218.

The frame differential component 210 provides the screen frame data to a processing device 220 so that it may be transmitted. The screen frame data may be either the entire screen frame data of the most current screen frame grabbed from the digitized video signal, or may be the screen frame data making up the difference detected by the XOR operation described above. Providing only the screen frame data representing the difference between the current screen frame and the preceding screen frame results in less data being distributed over the network 118.

Additional filtering functionality of the frame differential component 210 that is applicable when the analog video is digitized to reduce the amount of unnecessary data transfer may also be included, such as applying threshold comparisons to the most current screen frame data to determine whether to send the results of the XOR operation or send no new screen frame data. The threshold of this filtering component may be set as desired. As an example, the filter may look to apply a 7 bit per pixel threshold to determine whether the screen frame data has had a significant change worth transmitting or only contains sampling noise where an analog to digital converter is used. When changes in the current screen frame data are significant as determined by the threshold, then the result of the XOR may be transmitted. The frame differential component 210 may be implemented in various ways, including a programmable logic device such as a field programmable gate array or application specific integrated circuit that is configured to implement the XOR operations and provide the result to the processing device 220.

The processing device 220 interacts with the frame differential component 210 to access the screen frame data to be provided to a network interface device 226. The processing device 220 may be implemented in various ways discussed above, such as but not limited to the POWERPC 405GPr general purpose reduced instruction set processor manufactured by IBM CORPORATION. The processing device 220 employs logic to package the screen frame data for transfer by the network device 226 via a particular protocol, such as TCP/IP.

The screen frame data may be packaged for distribution by the processing device 220 from a network node established by the processing device 220 through the network interface 226. As one alternative, the processing device 220 in association with the network interface 226 may implement logic to behave as a web server 224 having a particular IP address for the network 118. The web server 224 provides the screen frame data as a resource that can be requested by a remote computer 120 through the network 118 by accessing the IP address of the web server 224 via a dedicated or generic browser window, such as a web browser like Internet Explorer by Microsoft®.

The screen frame data may be utilized by the browser window of the remote computer 120 in various ways. As an example, the browser window may be used to download the screen frame data in a continuous streaming manner and the screen frame data may be incorporated for display on the screen 134 by a dedicated application program of the remote computer 120. As another example, the browser window of the remote computer 120 may download the screen frame data in a continuous streaming manner for display of the screen frames on the screen 134 within the browser window itself such as where the browser window is a web browser. The browser window may implement browser commands or plug-in logic dedicated for a particular operating system platform such as an ACTIVE X control to display the screen frames, or alternatively may implement a virtual machine that runs system independent browser commands such as a JAVA applet.

The processing device 220 interacts with SDRAM 222 to perform the processing operations including receiving the screen frame data and packaging the data for transfer by the network interface 226. Generally, the processing device 220 or network interface includes a media access control ("MAC"). The MAC obtains carrier access within a network to transmit the packets of the screen frame data and/or browser commands for physical layer transfer by the network interface 226. The network interface 226 may be of various forms such as a dial-up, digital subscriber line, ISDN, or cable modem or an Ethernet transceiver directly linked to a data network. The data is transferred from the transceiver of the network interface 226 via the network 118 to the appropriate IP address of the network interface 124 of the remote computer 120.

In addition to transferring the screen data to the remote computer 120 via the network 118, the network interface 226 also receives data transferred from the remote computer 120 over the network 118. The network interface 226 receives the request for screen frame data that occurs once the remote computer's browser has been directed to the IP address of the web server 224 of the interaction device 110. An example of a network interface 226 is a "phy" such as model LXT972A manufactured by INTEL CORPORATION.

Additionally, the network interface 226 may receive data from the remote computer 120 that is indicative of the user activity occurring on the user interface devices of the remote computer 120. As discussed above, the end user may interact with the local computer screen frame being displayed on the screen 134 of the remote computer 120 by using the mouse and keyboard when the focus of the remote computer 120 is within the browser window display. The browser commands receive the user input of the user interface device and generate data corresponding to the user input relative to the local computer screen frame. The data is transmitted to the interaction device 110.

The interaction device 110 receives the data indicating the user activity through the network interface 226 where it is unpackaged from its transmitted state back to data that can be interpreted by the processing device 220. The processing device 220 receives the data describing the user activity that took place through the user interface devices of the remote computer 102. The processing device 220 then outputs a user interface command to a microcontroller 228 that arbitrates between the user input received over the network and the local user input received through a bus connection to an 80C42 compatible keyboard/mouse controller 232 that is coupled to the local mouse and keyboard. The microcontroller 228 may arbitrate by giving priority to one of the inputs where both the local and remote user input is received simultaneously to produce a clock and data output that is sent to the mouse or keyboard port of the local computer 102. In many instances, it may be appropriate to give the user input received over the network connection priority over local user inputs.

The local computer 102 implements the user activities transferred to the interaction device 110 over the network 118 as if they occurred through the user interface devices (i.e., mouse 112 and/or keyboard 114) directly coupled to the interface device 110. The user interface data provided as signals from the mouse or keyboard ports of the microcontroller 228 to the mouse port 104 or keyboard port 108 of the local computer 102 appear as ordinary mouse and keyboard data and clock signals.

To establish the USB connectivity discussed above between the interaction device 110 and the local computer 102, a USB microcontroller 234 may be included. The USB microcontroller 234 communicates with the processing device 220 to emulate a USB node for the local computer 102. Thus, a media source of the remote computer may be accessible by the local computer 102 by the USB microcontroller 234 emulating a USB media device for the local computer 102. Also, as discussed above, the USB microcontroller 234 may allow the emulation of a keyboard and mouse for the USB input of the local computer 102 to pass local and/or remote keyboard and mouse signals to the local computer 102.

Figure 2B:
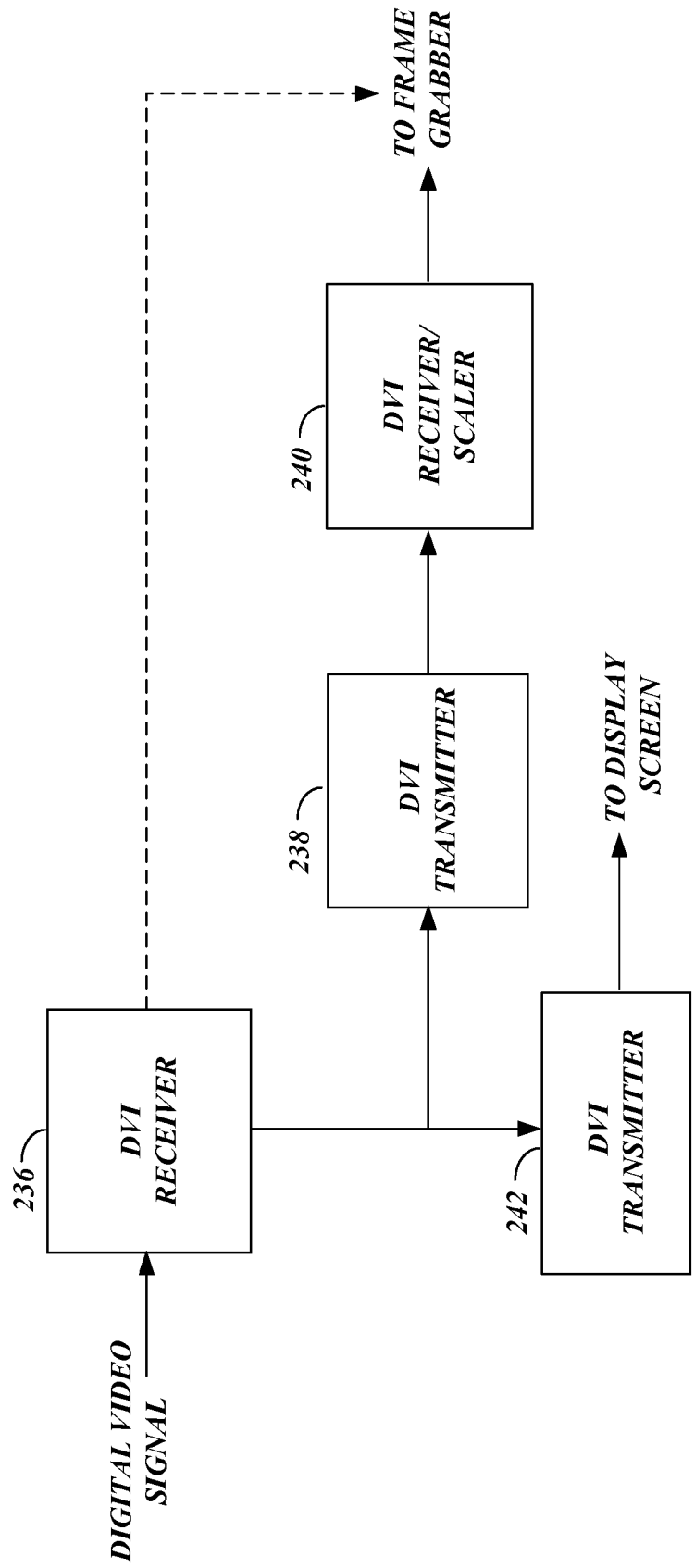
FIG. 2B shows the functional components for processing digital video signals within the embodiment of the present invention depicted in FIG. 2A.

As described briefly above, FIG. 2B depicts the interaction device components that replace the analog to digital converter 202 and the buffer 204 when a digital video signal is input to the interaction device 110 from local computer 102. First, the digital video signal is received at DVI receiver 236. The DVI receiver 236 creates and outputs a digital RGB signal from the digital video signal.

If it is desirable for the digital RGB signal to be scaled prior to capture and transmission through network 118 to remote computer 120, then DVI receiver 236 transmits the digital RGB signal to a DVI transmitter 238. The DVI transmitter 238 creates a duplication of the digital video signal from the digital RGB signal and transmits the duplication to DVI receiver/scaler 240. The DVI receiver/scaler 240 creates a scaled digital RGB signal from the duplication signal, which is sent to frame grabber 206, which stores screen frame data from the scaled digital RGB signal. If the digital RGB signal is not to be scaled prior to transmission through network 118 to remote computer 120, the digital RGB signal is transmitted to frame grabber 206.

Figure 13:
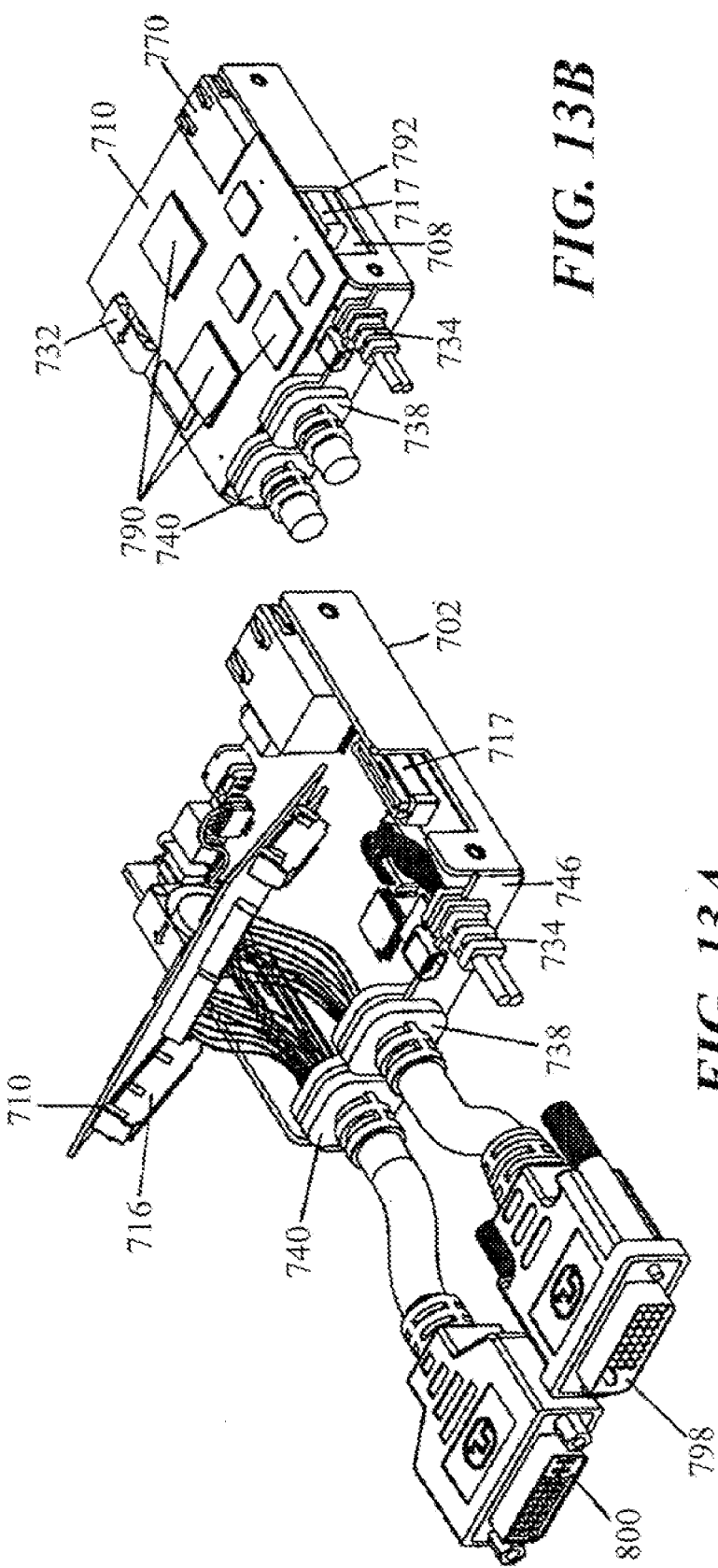
FIG. 13A illustrates the installation of digital video interface ("DVI") connectors and a second circuit board into the interaction device of FIG. 12.
FIG. 13B illustrates the interaction device of FIG. 13A after installation of the DVI connectors and second circuit board.

The digital RGB signal created by DVI receiver 236 is also simultaneously transmitted to the DVI transmitter 242. The DVI transmitter 242 creates a second duplication of the digital video signal from the digital RGB signal and transmits the second duplication via video output port 800 (shown in FIG. 13A) to local display screen 116.

Figure 3A:
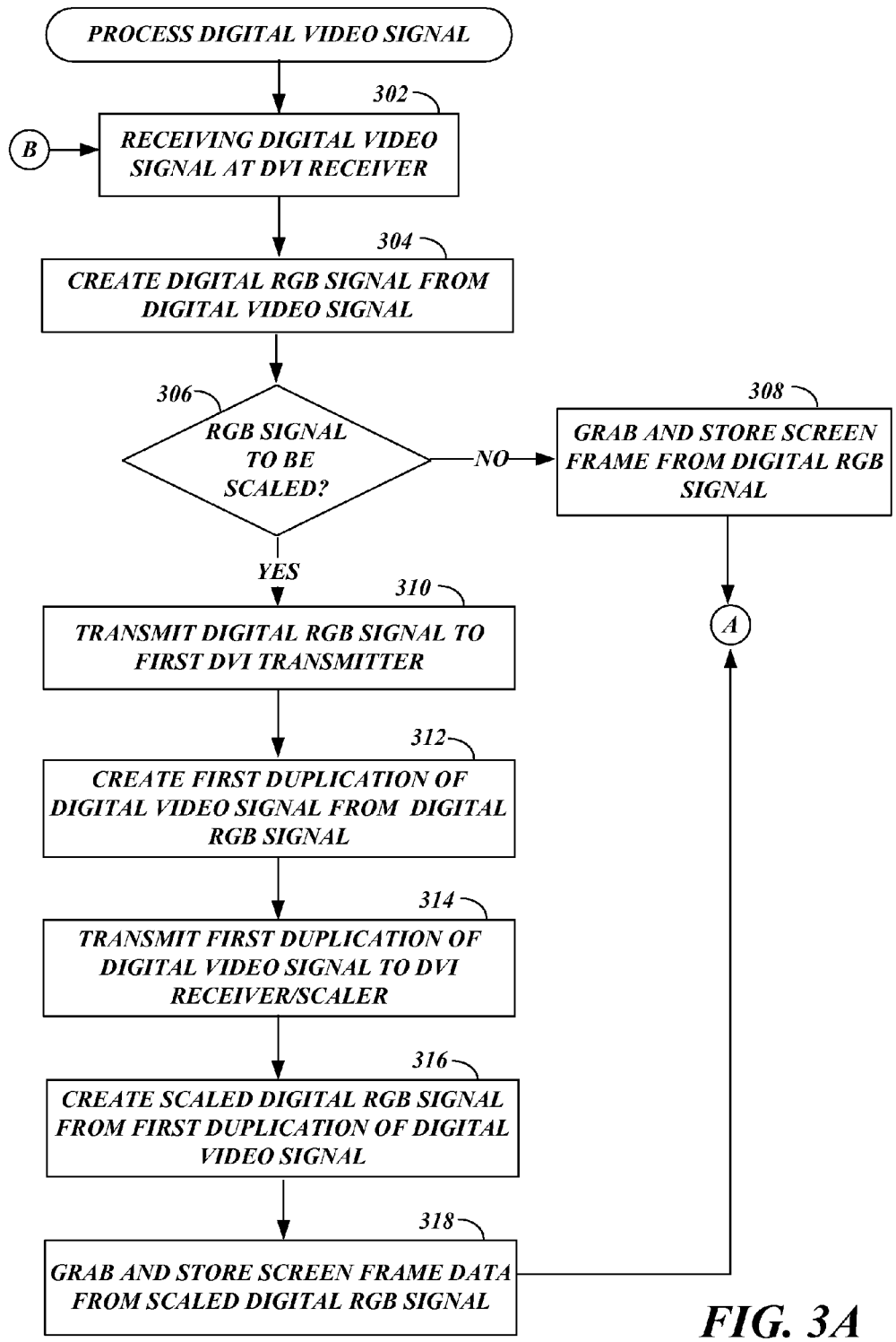
FIG. 3A depicts the logical operations for processing a digital video signal according to an embodiment of the present invention.

FIG. 3A depicts the logical operations 300 for processing a digital video signal through an interaction device 110 according to one embodiment of the present invention. First, a digital video signal is received at the DVI receiver 236 at receiving operation 302. A digital RGB signal is created from the digital video signal at signal creating operation 304. At decision operation 306, a determination is made as to whether the digital RGB signal is to be scaled prior to transmission through a network to the remote computer 120. If not, the process 300 proceeds to grab operation 308 where screen frame data from the digital RGB signal is grabbed and stored by the frame grabber 206 for use by the frame differential component 210. The process 300 then proceeds to step 332 of FIG. 3C as described below.

If, at decision operation 306, it is determined that the signal is to be scaled, the process 300 proceeds to transmit operation 310 where the digital RGB signal is transmitted to the DVI transmitter 238. The DVI transmitter 238 creates a first duplication of the digital video signal from the digital RGB signal at duplication operation 312. This first duplication signal is transmitted to the DVI receiver/scaler 240 at transmit operation 314. At scaling operation 316, the receiver/scaler 240 creates a scaled digital RGB signal from the first duplication signal. The process 300 then proceeds to frame operation 318 where screen frame data from the scaled digital RGB signal is grabbed and stored by the frame grabber 206 for use by the frame differential component 210. The process 300 then proceeds to step 332 of FIG. 3C as described below.

Figure 3B:
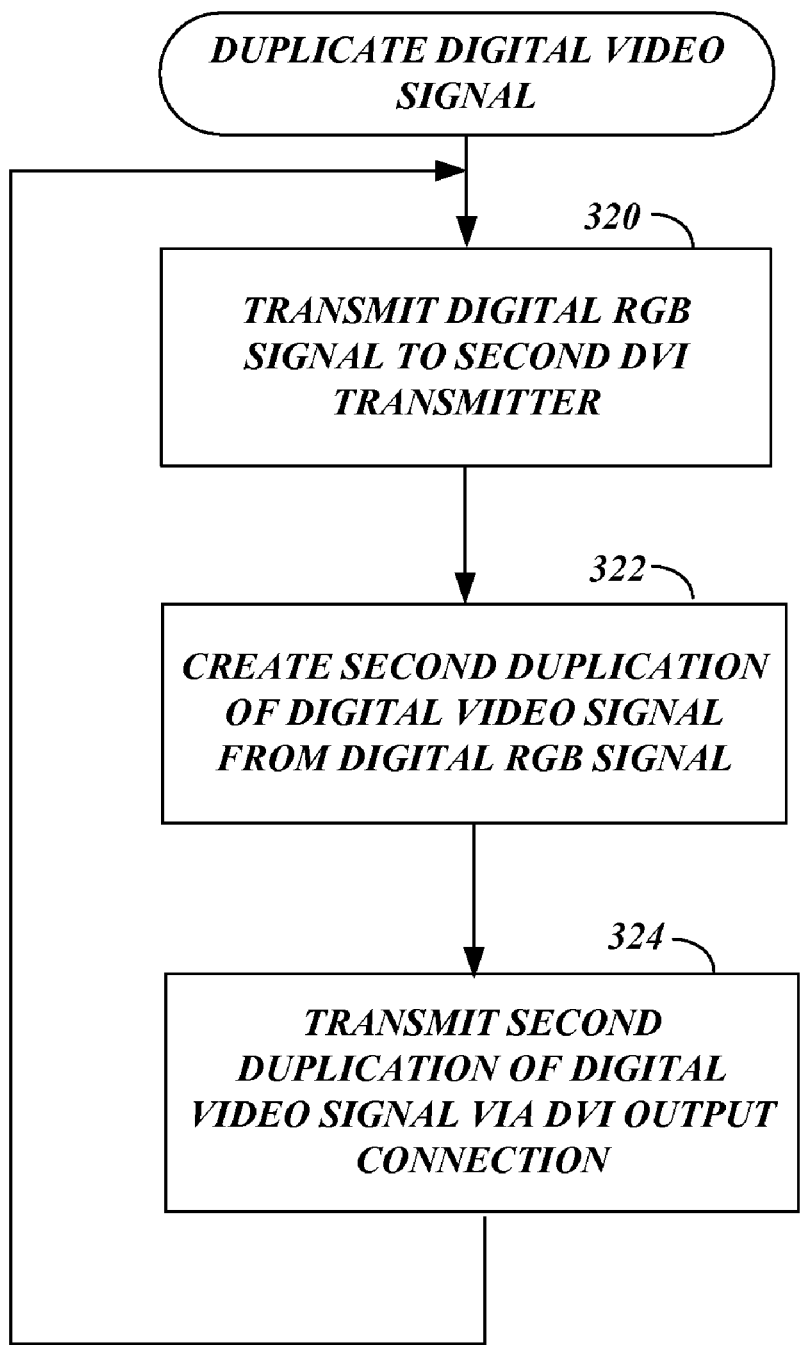
FIG. 3B depicts the logical operations for transmitting a digital video signal from the output of a local computer to a local display screen according to an embodiment of the present invention.

FIG. 3B shows logical operations to provide digital video signals from an output of local computer 102 to local display screen 116. The digital RGB signal created at signal creating operation 304 is transmitted to the DVI transmitter 242 at transmit operation 320. This transmission occurs in parallel with grab operation 308 described above or transmit operation 310 depending on whether the signal is to be scaled or not. A second duplication of the digital video signal from the digital RGB signal is created at duplication operation 322. The second duplication of the digital video signal is transmitted to a local display screen at transmit operation 324.

Figure 3C:
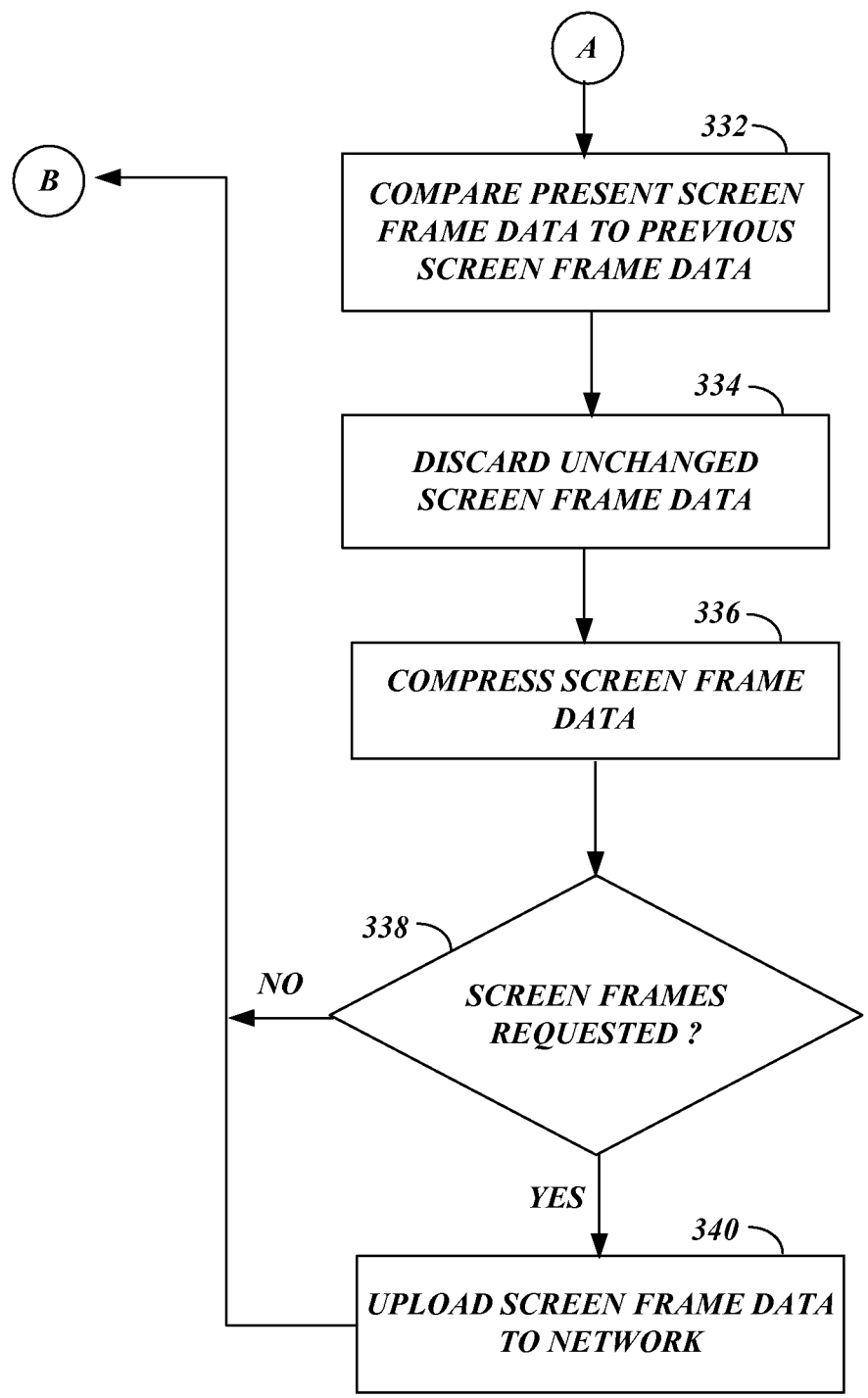
FIG. 3C depicts the logical operations of an embodiment of the present invention for obtaining screen frames from a local computer that may then be transmitted to a remote computer for display.

FIG. 3C shows logical operations that may be performed by the components of the interaction device 110 to provide screen frames of the local computer 102 to the remote computer 120. The operations begins with the frame grabber 206 grabbing a screen frame for the digitized video signal. This digitized signal may be the digital RGB signal from operation 308 or the scaled digital RGB signal from operation 318. As mentioned above, the digitized video signal may be produced by an analog to digital converter, may be taken directly from a digital video output of the local computer 102, and may be scaled or unscaled.

Once a screen frame has been obtained, the difference between the current screen frame data and the previous screen frame data is found through the filtering and/or XOR function as discussed above at comparison operation 332. At discard operation 334, the unchanged screen frame data can be discarded since it has already been transferred over the network 118 for the previous screen frame. As discussed above, an alternative to detecting the changes from one screen frame to the next is to always transfer the entire screen frame data rather than only the changes, but additional network bandwidth will be utilized by the larger data transfers. Also, as discussed above, rather than always sending the result of the XOR function, a threshold filter may be applied first to determine whether the current screen frame data has a significant change (e.g., greater than 7 bits of variation for a pixel value) to decide to send no screen frame data when the change is less than the threshold or to send the result of the XOR between the first and second screen frame data sets when the change is greater than the threshold.

After the screen frame data that is to be transferred has been obtained, the screen frame data may be compressed at compression operation 336. The screen frame data may be compressed through any one of various compression schemes to further reduce the amount of data to be transferred. The compression scheme may be programmed into either the frame differential component 210 or the processing device 220. Alternatively, the screen frame data may be transferred without being compressed, but additional network bandwidth will be utilized due to larger data transfers.

Query operation 338 of the web server 224 detects whether screen frames have been requested by an attempt to access the IP address of the web server 224 for the network 118. Once screen frame data has been requested, the current screen frame data that has been obtained and compressed is uploaded from the web server 224 over the network 118 at upload operation 340. The data is directed to the IP address of the remote computer 120 that addressed the web server 224. Additionally at upload operation 340, the control information 230 including browser commands such as a JAVA™ applet or Active X control may be transferred from the web server 224.

Figure 4:
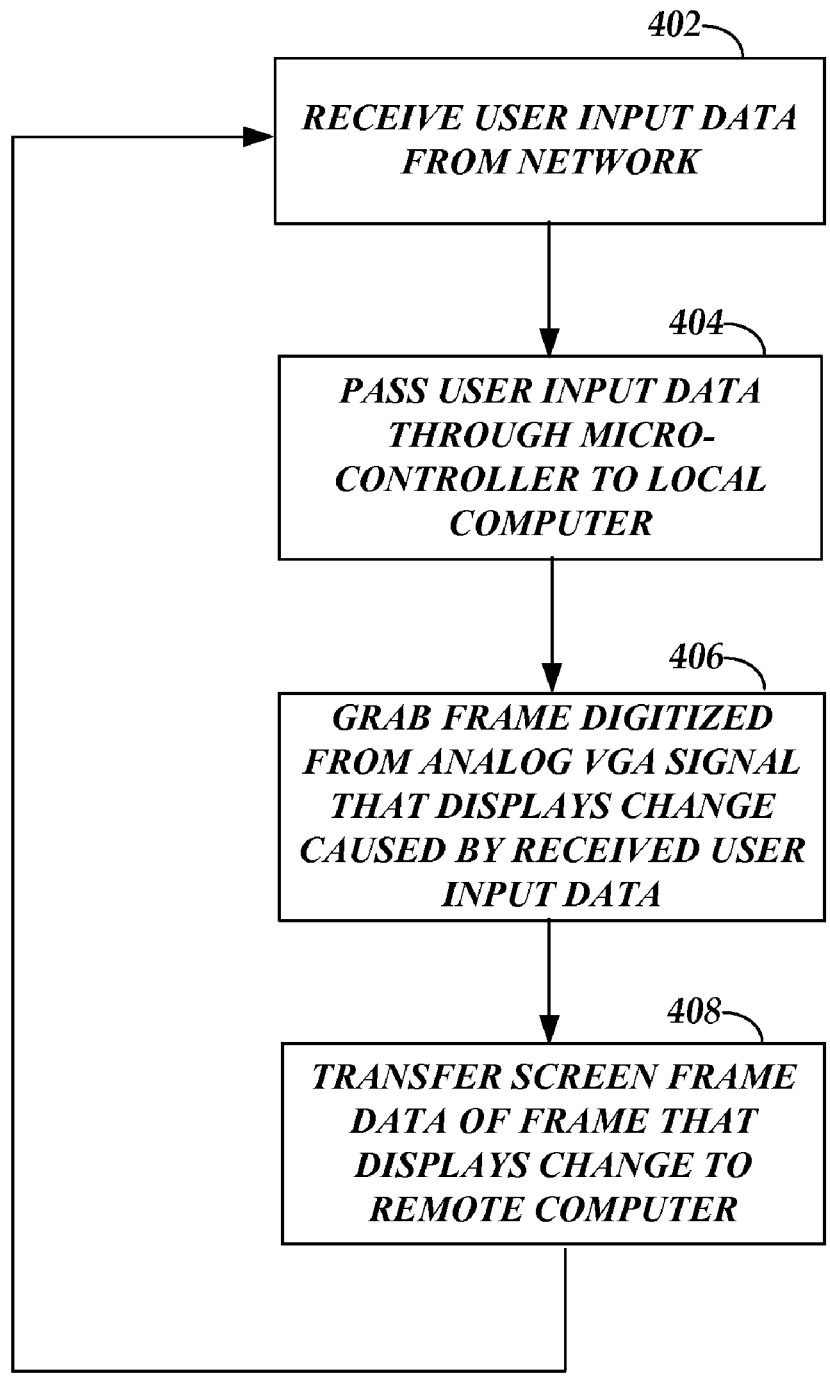
FIG. 4 shows the logical operations of the embodiment of FIG. 2A for allowing user activity occurring at the remote computer to be implemented at the local computer.

FIG. 4 shows the logical operations performed by the interaction device 110 to provide a user of the remote computer 120 the ability to interact with the local computer 102. The processing device 220 receives the user input data from the network 118 at input operation 402. The user input data is generally produced by the browser commands as a result of the user manipulating the mouse 130 or keyboard 132 in relation to the screen frame being displayed within the browser. As discussed above, the browser commands that detect the user input and produce the user input data may be a plug-in to the browser window or may be an applet that is distributed to the browser when screen frame data is initially requested.

Upon receiving the user input data from the network 118, the processing device 220 instructs the microcontroller 228 to provide mouse or keyboard data signals corresponding to the user input data to the local computer 102 at controller operation 404. Thus, the processing device 220 formulates an instruction to the microcontroller 228 to move the mouse pointer, perform a mouse click, or to enter keyboard entries as appropriate at the local computer 102.

During this time, the interaction device 110 continues to grab screen frames and transfer them to the remote computer 120. During and after implementing the mouse and keyboard activity received through the network 118, screen frames are obtained at frame operation 406 that display the change that has been implemented due to the user activity at the remote computer 120. For example, if the user activity is mouse pointer movement, then the succession of captured screen frames show the movement of the mouse pointer.

At transfer operation 408, the screen frame data that shows the user activity is transferred from the interaction device 110 to the remote computer 120. The remote computer 120 then updates the screen frame being displayed within the browser window. As previously discussed, this loop may result in artifacts such as multiple mouse pointers on the screen frame but as propagation and processing delays decrease, the immediate and delayed changes to the screen frame converge in time so that the artifacts are no longer perceivable. Also, the mouse over window option may be turned off at the remote computer for the browser window displaying the screen frames.

The process of updating the screen frame, receiving additional user input, transferring the user input for implementation by the local computer 102, and again updating the screen frame continues until the remote computer 120 no longer accesses the interaction device 110. This continuous loop allows the user of the remote computer 120 to interact with and manage the local computer 102.

Figure 5:
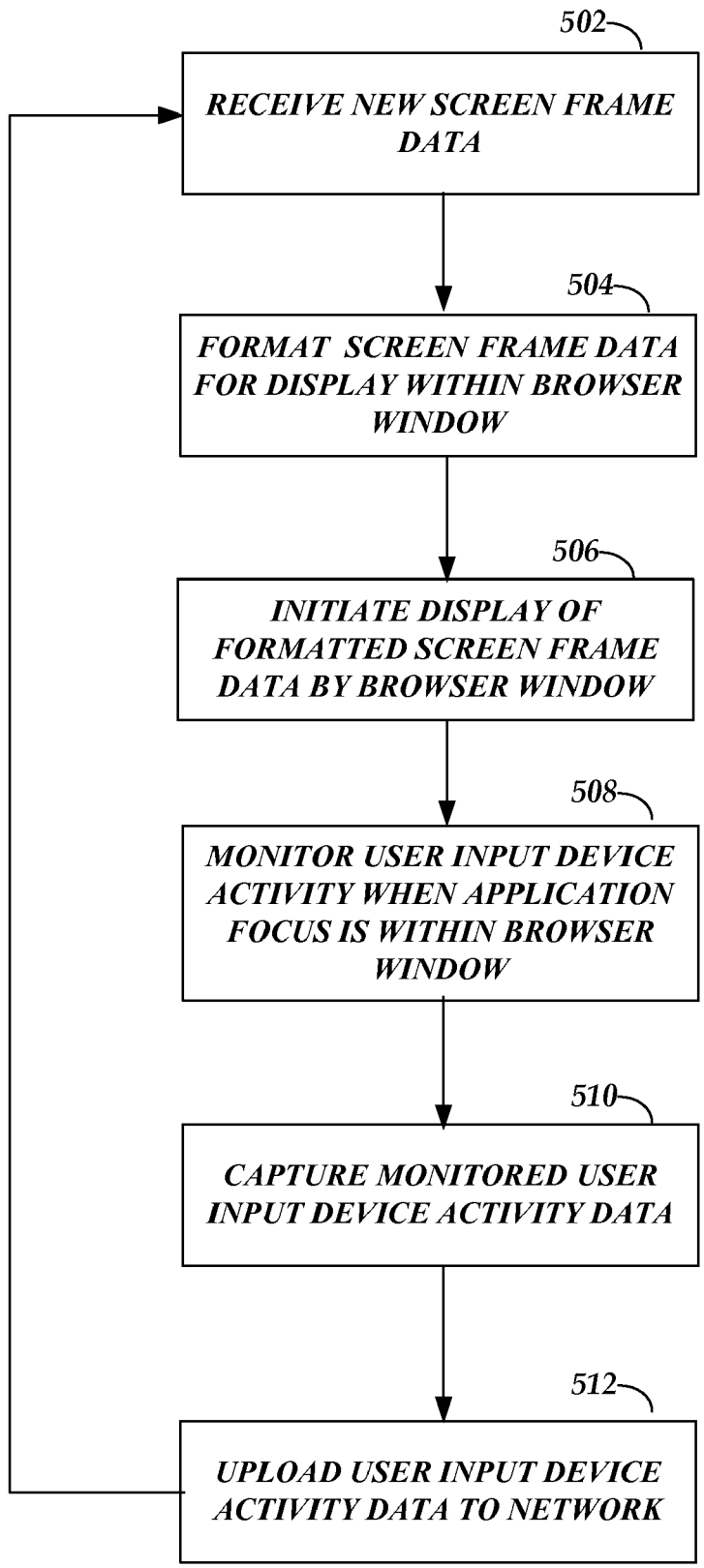
FIG. 5 illustrates the logical operations occurring at the remote computer for allowing screen frames of the local computer to be displayed at the remote computer.

Illustrative logical operations performed by the remote computer 120 to receive and display the screen frames of the local computer 102 are shown in FIG. 5. The remote computer 120 receives the most current screen frame data from the network 118 at receive operation 502. The remote computer 120 receives the screen frame data through the network interface 124 which provides the data to a processor that implements a dedicated application or browser window for displaying the screen frame.

The processor implementing the browser window formats the screen frame data for display within the browser window at format operation 504 by execution of the browser commands discussed above. Formatting the data involves either adapting the screen frame data for full screen display at the resolution provided by the remote computer 120 or for display within a GUI window on the display screen 134 with corresponding scroll bars for the window if necessary. The processor of the remote computer 120 then initiates display of the formatted screen frame data by the browser window at display operation 506.

The browser window implementing the browser commands then monitors for user activity within the screen frames being displayed by the browser window at monitor operation 508 whenever the browser window is the active focus of the GUI. When activity is detected, the browser commands cause user activity to be recorded at capture operation 510. Recording the user activity involves recording the mouse pointer movement and mouse clicks along with the relative coordinates of the mouse pointer within the screen frame. For example, if the mouse pointer is positioned at a particular location on the screen frame and is moving in a particular direction, the recorded user activity data includes both the location of the pointer relative to the coordinates defining the screen frame and the movement characteristics such as speed and direction. Additionally, recording the user activity involves recording the position of the cursor within the screen frame and any typing that occurs for the cursor position.

The browser commands then continually upload the user input data to the IP address of the web server 224 at upload operation 512. As discussed in relation to FIG. 4, the interaction device 110 receives the user input data and provides mouse and keyboard signals to the local computer 102 so that the user inputs received at the remote computer 120 can be implemented by the local computer 102. The updated screen frames of the local computer 102 are then captured and transferred to the remote computer 120 for display so that the user can see that the user input has been implemented.

Figure 6:
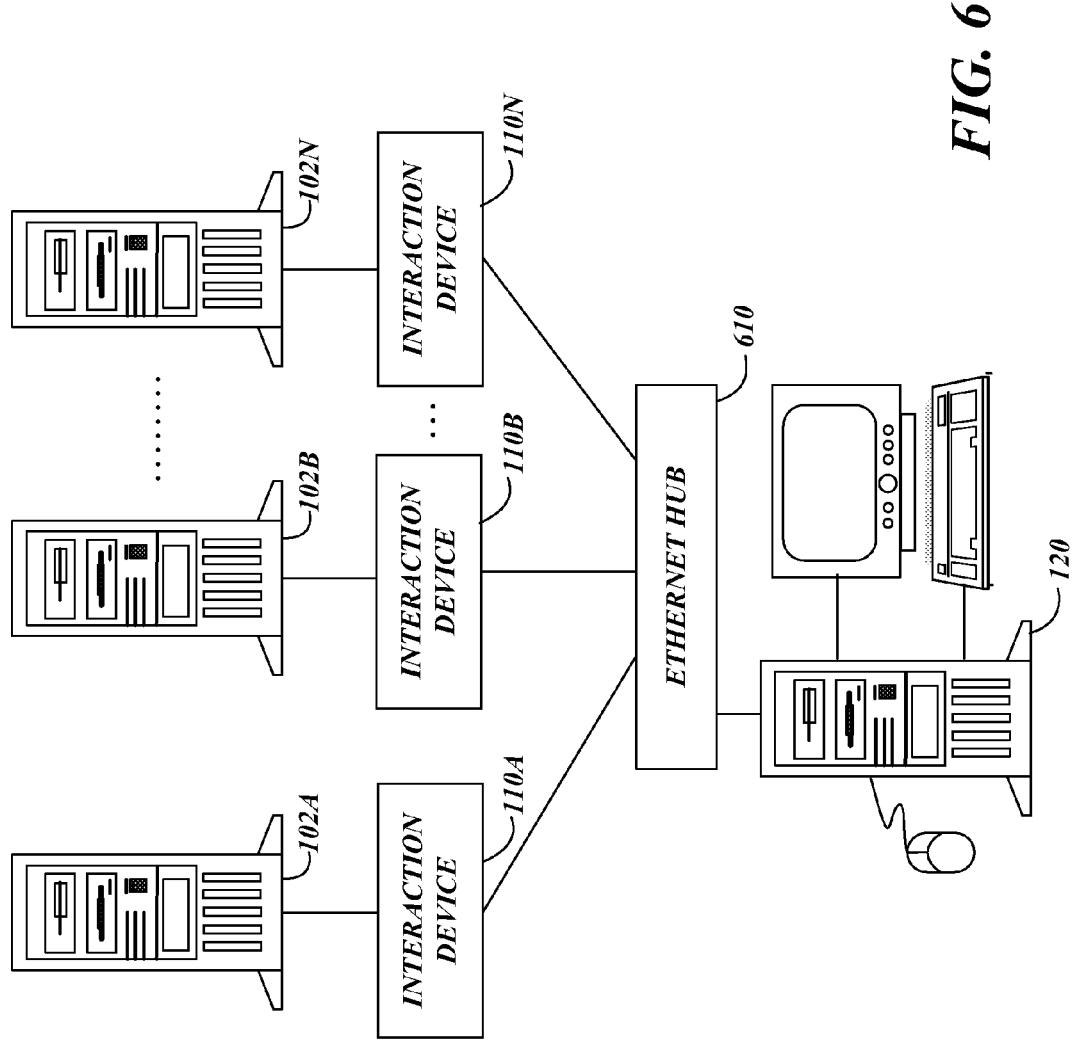
FIG. 6 illustrates an operating environment for embodiments of the present invention that allow a remote computer to display screen frames of a set of local computers and provide user interaction with the screen frames.

FIG. 6 depicts an operating environment for embodiments of the present invention that allow a remote computer to display screen frames of a set of local computers and provide user interaction with the screen frames. Each local computer 102A-N is interconnected to an interaction device 110 in the manner described above with respect to FIG. 1. The interaction devices 110A-N are then connected to a hub 610, which is again connected to a remote computer 120 typically over Ethernet. The remote computer 120 can access each interaction device 110A-N individually, or it can access all of the interaction devices simultaneously. Using this configuration, a user may capture screen frames from multiple local computers and interact with these computers in the same manner as described above for a single local computer 102.

Figure 7:
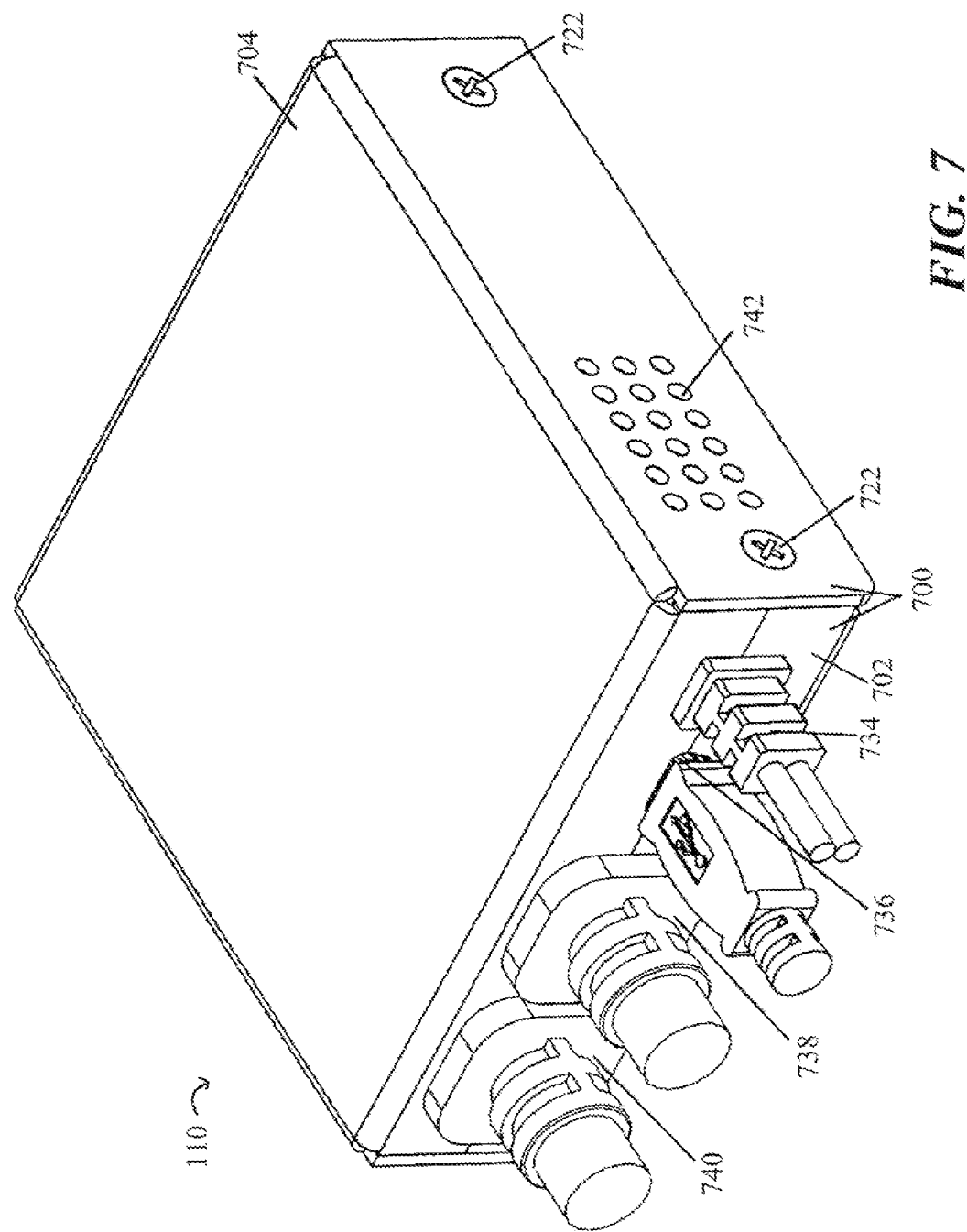
FIG. 7 shows a front perspective view of an interaction device according to one embodiment of the present invention.
Figure 8:
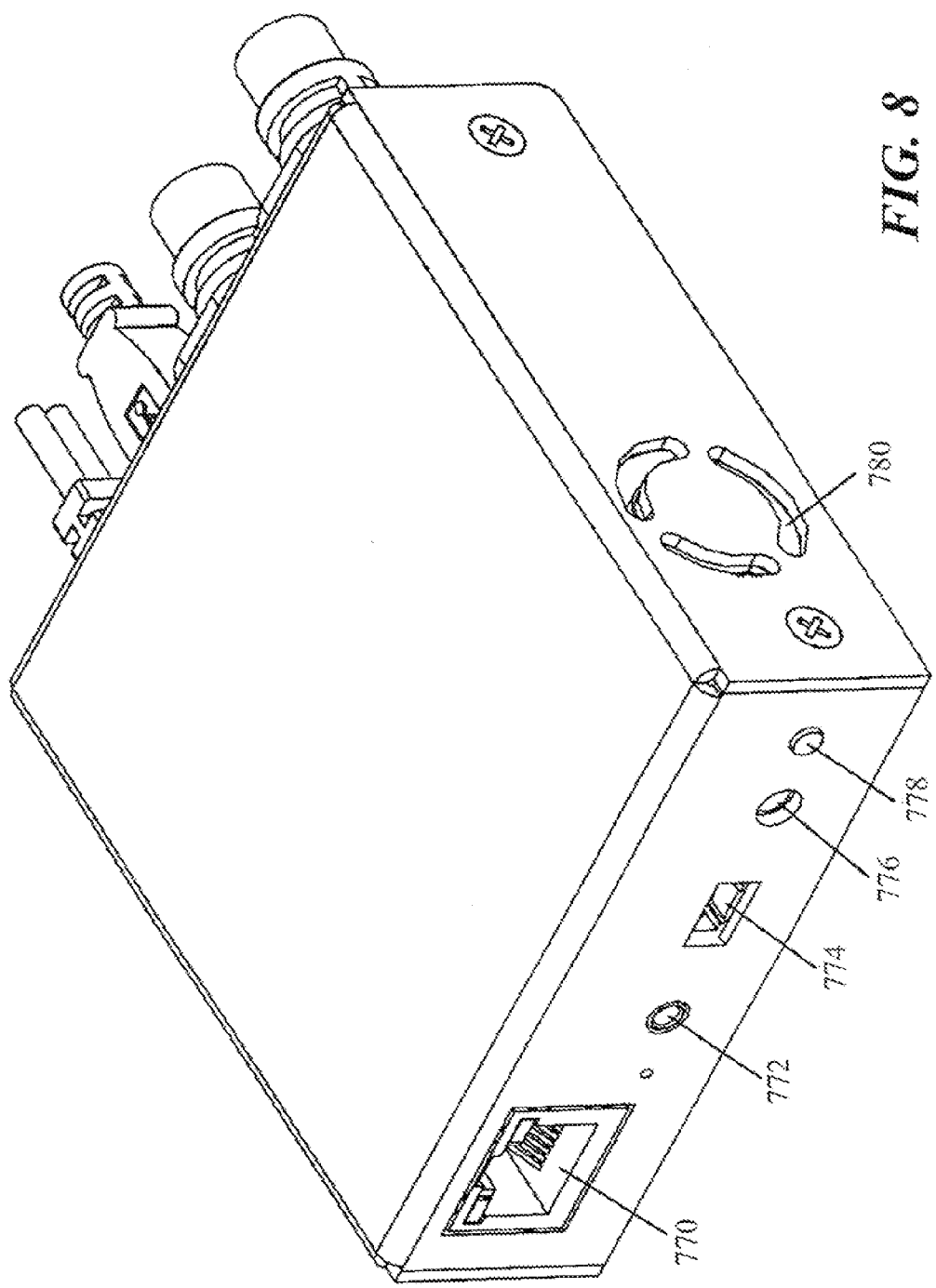
FIG. 8 shows a rear perspective view of an interaction device according to one embodiment of the present invention.

FIGS. 7 and 8 show perspective front and rear views respectively of an external implementation of the interaction device 110. Interaction device 110 has a housing 700 comprising a bottom cover 702 and a top cover 704. Housing 700 provides several ports for connection to local computer 102 and to a network 118 for communication with a remote computer 120. FIG. 7 shows strain relief grommet 734 for the mouse input port 794 and keyboard input port 796 (shown in FIG. 12) that are connected to the local mouse 112 and local keyboard 114, respectively. These input ports for the mouse and keyboard may be PS/2 style ports, standard keyboard ports, standard serial ports, or other connection types known for a keyboard and mouse.

Also seen in FIG. 7 are strain relief grommets 738 and 740 for the video input port 798 and video output port 800 (shown in FIG. 13A) that are connected to the local computer 102 and display monitor 116, respectively. These input and output ports 798 and 800 may be DVI male and female connectors, VGA male or female connectors, or any other connector types known for video input and output. The interaction device 110 also includes USB connector 736 to establish USB connectivity between the interaction device 110 and local computer 102 for USB node emulation as discussed above.

FIG. 8 shows a rear view of one embodiment of interaction device 110. Network connector 770 allows connection to network 118, providing a bi-directional communication path for sending and receiving data, as discussed above. A recovery switch allows a user to recover from a firmware upgrade where the upgrade process failed or was interrupted. Normally, a firmware upgrade is done over the network 118 through the network connector 770. If the connection is lost during an upgrade, the firmware image may be corrupted. The recovery switch may be held in at power-up, allowing the interaction device 110 to enter a protected boot block of code that is never overwritten during a firmware upgrade.

RS-232 port 772 provides an interface for connecting the interaction device 110 to a serial port of the local computer 102. A cable (not shown) may be provided with the interaction device 110 that has a connector for port 772 on one end and a standard DB-9 connector for a serial port on local computer 102. Port 772 may be used for debugging, diagnostics, and firmware upgrades. Additionally, a user may connect the interaction device 110 to a serial port of the local computer 102 using port 772 and associated cable, and use a terminal program to configure network settings, such as DCHP or static IP address, netmasks, and gateways. RS-232 port 772 may also be connected to a number of readily available power switches, which can be used to control power on and off to one or multiple servers.

Various power sources may be included for the device 110. On-board batteries and/or a wall adapter may be utilized to provide the DC voltage required by the circuitry described above. Furthermore, the device 110 may draw power from various connections made to the local computer 102, such as through the mouse or keyboard ports. Auxiliary port 774 provides a 3-pin connector for either receiving power for the interaction device 110 or for consuming power from the interaction device. An external device may be attached to the interaction device 110 through auxiliary port 774. If the device connected to port 774 requires power, the interaction device 110 can provide a current through port 774. In this situation, a DC power supply must be attached to the interaction device 110 through port 776. DC power supply port 776 is provided for use with a wall adapter. LED 778 provides an indication that interaction device 110 is receiving power.

One side of housing 700 provides aperture 780 behind which fan assembly 732 is mounted. The opposing side of housing 700 provides a plurality of ventilation holes 742 (shown in FIG. 9) to further aid in device cooling. It is to be understood that housing 700 may provide apertures for any number and variety of connectors, LEDs, and cooling devices. Additionally, it is to be understood that while housing 700 has been described here and shown in FIGS. 7-14 as substantially a six-sided device, housing 700 may be formed in any shape and with any dimensions.

The external interaction device 110 allows the device to be easily added to a local computer 102. Because all connections to the local computer 102 are external, the device 110 can be quickly and easily installed or removed. However, it should be appreciated that the interaction device 110 may be of various forms, including internal implementations where the device 110 is located inside the local computer 102 and one or more of the connections to the local computer 102 are made internally.

Figure 9:
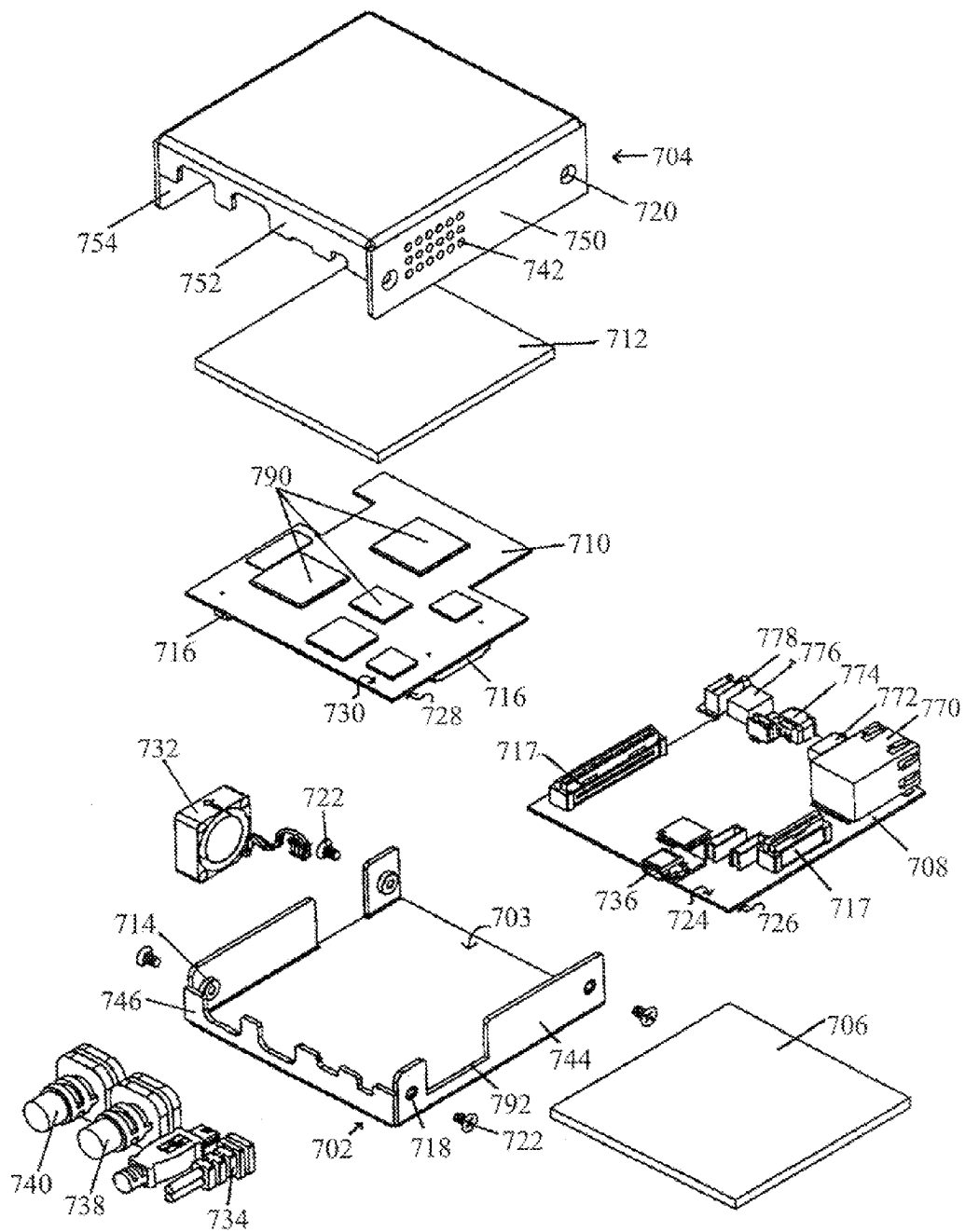
FIG. 9 shows an exploded top perspective view of an interaction device according to one embodiment of the present invention.

Referring to FIG. 9, housing 700 comprises bottom cover 702 and top cover 704. Housing 700 has an inner surface 703. Gap pads 706 and 712 and circuit boards 708 and 710 are enclosed within housing 700. Circuit board 708 has an inner surface 724 and an outer surface 726. Circuit board 710 also has an inner surface 728 and an outer surface 730. The outer surfaces 726 and 730 of circuit boards 708 and 710 face the inner surfaces 703 of bottom cover 702 and top cover 704 respectively. Gap pads 706 and 712 are disposed intermediate the outer surfaces 726 and 730 and the inner surface 703 of housing 700.

While FIGS. 7-14 depict housing 700 as comprising two sections, bottom cover 702 and top cover 704, it is to be understood that any number of sections may be joined together to form housing 700, including forming an integral housing out of a single piece of material. It is to be understood that the pads may alternatively be attached to bottom cover 702 and top cover 704, instead of being attached to the circuit boards, may be attached using any means now known or developed in the future, or may be disposed between the housing and the circuit boards without being attached to either. Gap pads 706 and 712 comprise any material that is electrically non-conductive and thermally conductive which transfer heat away from circuit board mounted components. For instance, GAP PAD VO ULTRA SOFT pads manufactured by THE BERQUIST COMPANY of Chanhassen, Minn. may be utilized.

A plurality of standoffs 714 are affixed to bottom cover 702. Standoffs 714 project from the walls of bottom cover 702, slidably engaging the inner surface of circuit board 708. Additionally, standoffs 714 surround threaded apertures 718 that align with apertures 720 in top cover 704 and engage corresponding threaded fasteners 722 to secure top cover 704 to bottom cover 702. When installed into bottom cover 702, circuit board 708 is disposed between standoffs 714 and bottom cover 702 such that pad 706 contacts both the inner surface of bottom cover 702 and the components mounted to the outer surface of circuit board 708.

It is to be understood that while standoffs 714 appear in FIG. 9 to be circular disks, they may take any shape or form and may be manufactured from any material. Additionally, standoffs 714 may be threaded to receive fasteners 722 in place of or in addition to apertures 718. In another embodiment not shown, circuit board 708 is secured in housing 700 through the use of grooves in the walls of bottom cover 702, into which circuit board 708 slidably engages. In this embodiment, threaded apertures 718 exist to receive fasteners 722 for securing top cover 704 to bottom cover 702. In yet another embodiment not shown, circuit board 708 is secured into bottom cover 702 using spring arms rather than sliding under standoffs 714. Circuit board 708 is inserted vertically downward into bottom housing cover 702 such that circuit board 708 depresses the spring arms toward the side walls of bottom cover 702. As the edges of circuit board 708 clear the ends of the spring arms, the spring arms snap back to their original position, preventing circuit board 708 from being removed without depressing the spring arms.

Circuit board 710 is mounted to and electrically coupled to circuit board 708 through the use of board-to-board connectors 716 mounted on the inner surfaces of circuit boards 708 and 710. Top cover 704 fits over circuit board 710 and pad 712 such that apertures 720 align with apertures 718 in bottom cover 702 to receive fasteners 722. With top cover 704 mated to bottom cover 702, pads 706 and 712 abut the inner surfaces of the housing and the components mounted to circuit boards 708 and 710. Bottom cover 702 and top 704 are made of metal. It is to be understood that housing 700 may be manufactured from any thermally conductive material suitable for transferring heat away from pads 706 and 712.

Figure 10:
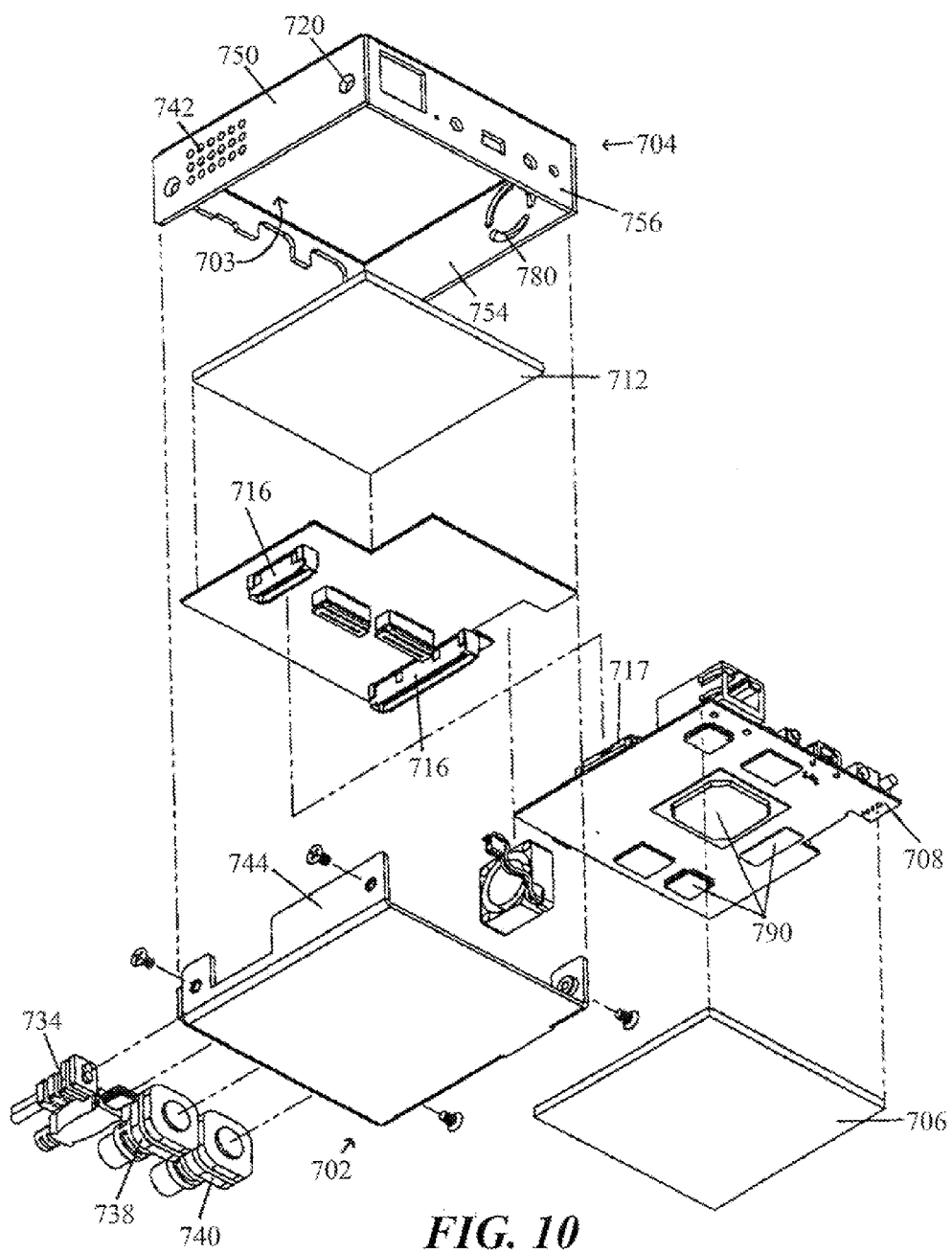
FIG. 10 shows an exploded bottom perspective view of an interaction device according to one embodiment of the present invention.

FIGS. 9 and 10 depict bottom cover 702 as comprising a four-sided horizontal surface that is substantially planar between the four sides, with vertical walls 744, 746, and 748 extending from the horizontal surface along three sides. Likewise, top cover 704 comprises a four-sided horizontal surface that is substantially planar between the four sides and is parallel to the plane of the horizontal surface of bottom cover 702. Top cover 704 has vertical walls, 750, 752, 754, and 756 extending from the sides of the horizontal surface. Wall 746 comprises cut-outs that correspond to the dimensions of grommets 734, 738, and 740 as well as USB connector 736. Wall 752 contains similar cut-outs. When top cover 704 is mated with bottom cover 702, wall 746 abuts wall 752 to form a front side of housing 700 wherein the cut-outs create apertures sized to secure the corresponding connectors. Walls 750 and 754 cover the exterior surface of walls 744 and 748 such that apertures 720 align with apertures 718 for insertion of fasteners 722.

To effectively dissipate heat away from heat-generating components mounted on circuit boards 708 and 710, the heat-generating components are mounted on the outer surfaces of circuit boards 708 and 710. Examples of heat-generating components include but are not limited to processors, SDRAMs, flash-ROM, USB controllers, switching power supply regulators and associated transistors, linear regulators, micro-controllers, Ethernet PHY, DVI receivers, DVI transmitters, FPGA, VGA video OP-AMP buffers, and analog-to-digital converters. In mounting heat-generating components on the outer surfaces of the circuit boards, the risk of significant heat buildup in the space between the circuit boards is minimized. Gap pads 706 and 712 are in contact with the heat-generating components.

As the components produce heat, the heat is transferred from the components, through the pads, through the housing, and into the atmosphere. Components that do not generate significant amounts of heat may be mounted on the inner surfaces of circuit boards 708 and 710 to efficiently utilize the space within housing 700. With fan assembly 732 mounted on one side of housing 700 and ventilation holes 742 positioned on the opposing side of housing 700, heated air is drawn from interaction device 110 or ambient air is pushed into housing 700 to aid in maintaining an acceptable operating temperature within interaction device 110. Using this configuration, the interaction device 110 is maintained at a temperature suitable for reliable operation while aiding portability by minimizing the device's overall footprint.

Circuit board 710 may be configured for either digital or analog image capturing. FIG. 13A shows male and female DVI connectors and their connections to their corresponding headers on circuit board 710. When circuit board 710 is configured for digital image capturing, DVI receivers, DVI transmitters, FPGA, SDRAMs, and switching power supply regulators and associated transistors may be mounted on the outer surface of the circuit board for contact with gap pad 712. Circuit board 710 may also be configured for analog image capturing. When configured for analog image capturing, male and female VGA connectors are attached to their corresponding headers on circuit board 710, and VGA video OP-AMP buffers, an analog-to-digital converter, FPGA, SDRAMs, and switching power supply regulators and associated transistors may be mounted on the outer surface of the circuit board for contact with gap pad 712. The remaining heat-generating components may be mounted on the outer surface of circuit board 708.

Using this configuration, interaction device 110 may be easily reconfigured from analog image capturing to digital, or from digital image capturing to analog. It is to be understood that the present invention is not limited to the use of two circuit boards. All of the components could be mounted on a single circuit board, or on more than two circuit boards depending on the particular application and desired housing dimensions. When utilizing more than two circuit boards, the heat-generating components are disposed on the outer surfaces of the outside circuit boards, while the remaining components are mounted on inside circuit boards to aid in heat removal out of interaction device 110 through the gap pads to the housing. The outside circuit boards are those that are disposed adjacent to the inner surface 703 of housing 700 such that no other circuit boards are disposed between the outer surfaces of the outside circuit boards and the inner surface 703 of housing 700. The use of two circuit boards as described here allows for a compact device that is easy to configure and which effectively dissipates heat.

Figure 11:
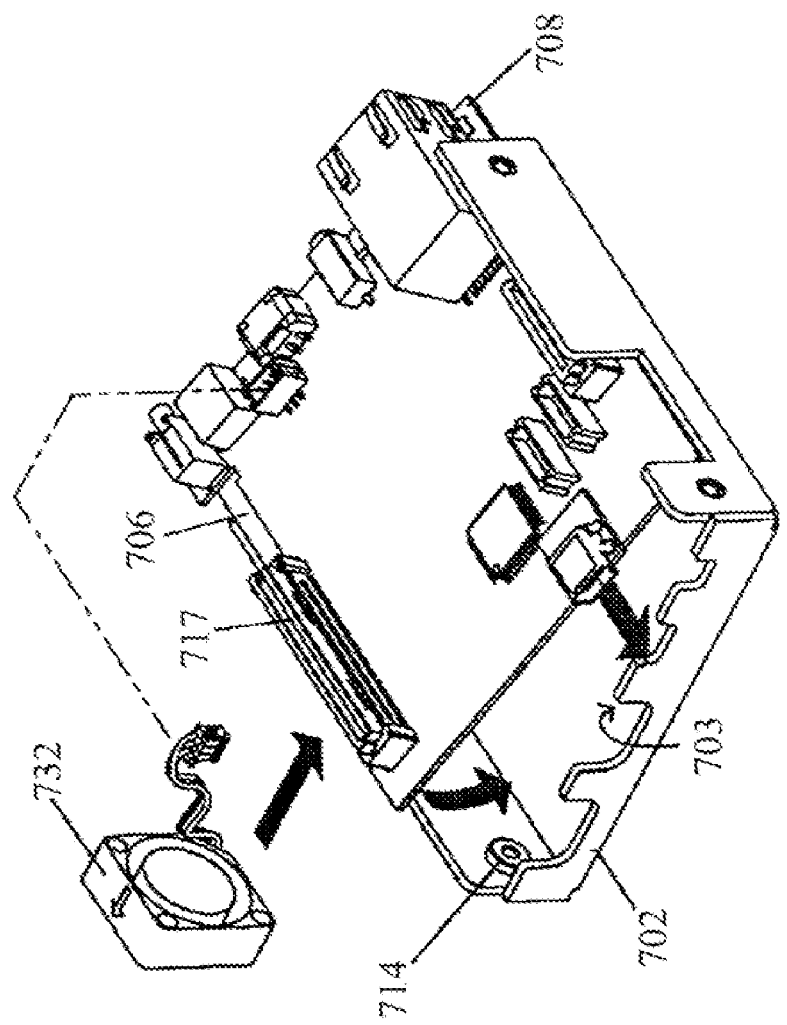
FIG. 11 illustrates the installation of a circuit board and fan assembly into a bottom cover of an interaction device according to one embodiment of the present invention.

The present invention is also directed to a method of assembly for an interaction device for obtaining screen displays of a local computer and providing them to a remote computer over a network. This method is illustrated in FIGS. 11-14. Heat generating components 790 are mounted to outer surfaces of circuit boards 708 and 710. Heat generating components may include but are not limited to processors, SDRAMs, flash-ROM, USB controllers, switching power supply regulators and associated transistors, linear regulators, micro-controllers, Ethernet PHY, DVI receivers, DVI transmitters, FPGA, VGA video OP-AMP buffers, and analog-to-digital converters. As seen in FIG. 11, a first gap pad 706 is attached to the outer surface of circuit board 708 such that it contacts heat generating components 790.

Circuit board 708 is slid into bottom cover 702 such that opposing edges of circuit board 708 slide under standoffs 714 located on the inner surfaces of the side walls to bottom cover 702. When circuit board 708 is in place, standoffs 714 contact the inner surface to hold circuit board 708 in place. Standoffs 714 are positioned to ensure that circuit board 708 is held snugly in place such that gap pad 706 contacts the inner surface 703 of bottom cover 702 and the heat generating components 790 on the outer surface of circuit board 708. Fan assembly 732 is connected to a fan header on circuit board 708 and positioned in a cut-out of circuit board 708 such that it contacts gap pad 706 and removes hot air from within interaction device 110 through an aperture or series of apertures in the side wall of bottom cover 702. It is to be understood that fan assembly 732 may be positioned such that it blows ambient air into interaction device 110 rather than blowing heated air out of interaction device 110.

Figure 12:
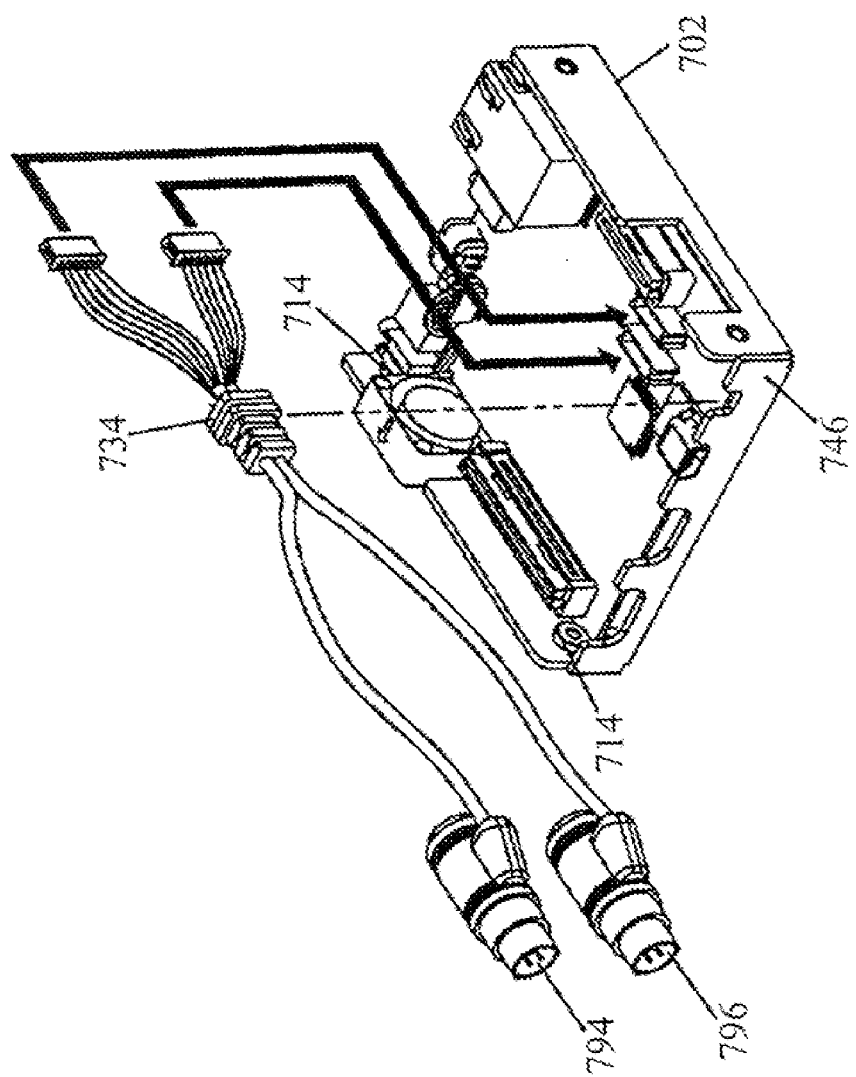
FIG. 12 illustrates the installation of mouse and keyboard connectors into the interaction device of FIG. 11.

As seen in FIG. 12, mouse and keyboard input ports 794 and 796 are placed in corresponding headers on circuit board 708. The mouse and keyboard grommet 734 is slid in place in a cut-out in wall 746 of bottom cover 702. If interaction device 110 is to be configured for capturing digital screen images, male and female DVI connectors are placed in corresponding headers on circuit board 710, as shown in FIG. 13A. The strain relief grommets 738 and 740 for male and female DVI connectors 798 and 800 are seated into cut-outs in wall 746 of bottom cover 702. If interaction device 110 is to be configured for capturing analog screen images, male and female VGA connectors are substituted for male and female DVI connectors (not shown). After connecting the video connectors to circuit board 710, board-to-board connectors 716 on circuit board 710 are mated to board-to-board connectors 717 on circuit board 708.

FIG. 13B shows the interaction device with circuit boards 708 and 710 installed. Connector strain relief grommets 734, 738, and 740 can be seen as well as fan assembly 732. Heat producing components 790 are seen mounted on the outer surface of circuit board 710. Cutout 792 provides ventilation of the space between circuit boards 708 and 710. Ventilation holes 742, shown in FIG. 14 will align with cutout 792 when the top cover 704 is installed, allowing the fan to push or pull air through the gap between circuit boards 708 and 710.

Figure 14:
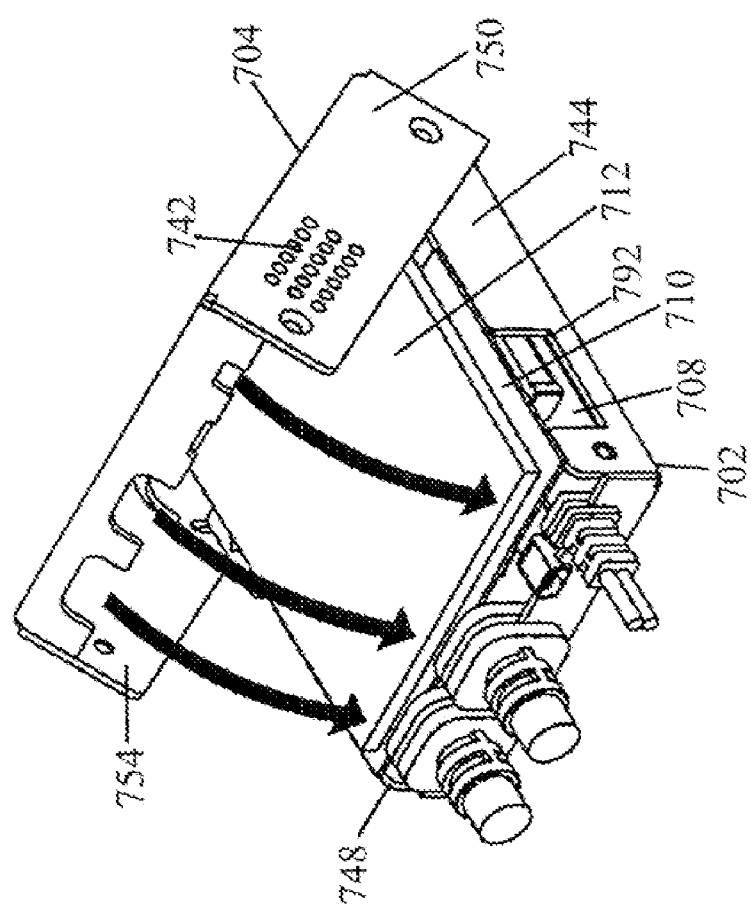
FIG. 14 illustrates the installation of a gap pad and top cover on the interaction device of FIG. 13B.

As seen in FIG. 14, a second gap pad 712 is attached to the outer surface of circuit board 710. Gap pad 712 is pressed lightly against the outer surface of circuit board 710 such that it contacts heat generating components 790. Finally, top cover 704 is placed over gap pad 712 such that gap pad 712 contacts the inner surface of top cover 704 as well as the heat generating components 790 mounted on the outer surface of circuit board 710. With top cover 704 in place, walls 750 and 754 enclose walls 744 and 748 of bottom cover 702 such that the inner surfaces of walls 750 and 754 abut the outer surfaces of walls 744 and 748 and apertures 720 in walls 750 and 754 align with apertures 718 in walls 744 and 748. Fasteners 722 are screwed into the aligned apertures 720 and 718 to secure the top cover 704 to bottom cover 702.

It is to be understood that top cover 704 may be secured to bottom cover 702 using any fastening means to include but not limited to clips, latches, hinge and latch mechanisms, nuts and bolts, and screws that engage threads on the top cover, the bottom cover, standoffs 714, or any combination therein.

Although the present invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for obtaining screen displays of a local computer and providing them to a remote computer over a network, comprising:
   receiving a digital video signal representing screen frames of the local computer via a digital video interface ("DVI") input connection at a first DVI receiver;
   at the first DVI receiver, creating a first digital red-green-blue ("RGB") signal from the received digital video signal;
   grabbing and storing a screen frame from the digital RGB signal;
   transmitting data related to the stored screen frame through a network interface; and
   providing the first digital RGB signal to a DVI transmitter, creating a duplication of the digital video signal from the first digital RGB signal at the DVI transmitter, and transmitting the duplication via a DVI output connection.

2. The method of claim 1, wherein transmitting data related to the stored screen frame comprises transmitting all of the data representing the screen frame.

3. The method of claim 1, further comprising detecting differences between the stored screen frame and a previously stored screen frame, and wherein transmitting data related to the stored screen frame comprises transmitting data representing the differences.

4. A method for obtaining screen displays of a local computer and providing them to a remote computer over a network, comprising:
   receiving a digital video signal representing screen frames of the local computer via a DVI input connection at a first DVI receiver;
   at the first DVI receiver, creating a first digital RGB signal from the received digital video signal;
   providing the first digital RGB signal to a first DVI transmitter, creating a first duplication of the digital video signal from the first digital RGB signal at the first DVI transmitter and transmitting the first duplication to a DVI receiver and scaler;
   at the DVI receiver and scaler, creating a scaled digital RGB signal from the first duplication;
   grabbing and storing a screen frame from the scaled digital RGB signal;
   transmitting data related to the stored screen frame through a network interface; and
   providing the first digital RGB signal to a second DVI transmitter, creating a second duplication of the digital video signal from the first digital RGB signal at the second DVI transmitter, and transmitting the second duplication via a DVI output connection.

5. The method of claim 4, wherein transmitting data related to the stored screen frame comprises transmitting all of the data representing the screen frame.

6. The method of claim 4, further comprising detecting differences between the stored screen frame and a previously stored screen frame, and wherein transmitting data related to the stored screen frame comprises transmitting data representing the differences.

7. An interaction device for obtaining screen displays of a local computer and providing them to a remote computer over a network, comprising:
   a DVI input connection that receives a digital video signal;
   a DVI receiver that creates a first digital RGB signal from the digital video signal;
   a frame grabber that captures screen frame data from the digital RGB signal;
   a network interface that provides data related to the screen frame data over the network;
   a DVI transmitter that receives the digital RGB signal, creates a duplication of the digital video signal from the digital RGB signal, and transmits the duplication;
   a DVI output connection that outputs the duplication of the digital video signal; and
   a housing encompassing the DVI input connection, the DVI receiver, the frame grabber, the network interface, the DVI transmitter, and the DVI output connection such that the DVI input connection, the network interface, and the DVI output connection are externally accessible.

8. The interaction device of claim 7, wherein the network interface provides data related to the stored screen frame by transmitting all of the data representing the screen frame.

9. The interaction device of claim 7, further comprising logic to detect differences between the screen frame and a previously stored screen frame, and wherein the network interface provides data related to the stored screen frame by transmitting data representing the differences.

10. An interaction device for obtaining screen displays of a local computer and providing them to a remote computer over a network, comprising:
- a DVI input connection operative to receive a digital video signal;
- a first DVI receiver operative to create a digital RGB signal from the digital video signal and simultaneously transmit the digital RGB signal to a first DVI transmitter and to a second DVI transmitter;
- the first DVI transmitter operative to receive the digital RGB signal from the first DVI receiver, create a first duplication of the digital video signal from the digital RGB signal, and transmit the first duplication of the digital video signal to a DVI receiver and scaler;
- the DVI receiver and scaler operative to receive the first duplication of the digital video signal, scale the digital video signal, and create a scaled digital RGB signal;
- a frame grabber operative to capture screen frame data from the scaled digital RGB signal;
- a network interface operative to provide data related to the screen frame data over the network;
- the second DVI transmitter operative to receive the digital RGB signal, create a second duplication of the digital video signal from the digital RGB signal, and transmit the second duplication to a DVI output connection; and
- the DVI output connection operative to output the second duplication of the digital video signal.

11. The interaction device of claim 10, wherein the network interface transmits data related to the stored screen frame by transmitting all of the data representing the screen frame.

12. The interaction device of claim 10, further comprising logic to detect differences between the stored screen frame and a previously stored screen frame, and wherein the network interface transmits data related to the stored screen frame by transmitting data representing the differences.

* * * * *